United States Patent [19]
Yamaguchi et al.

[11] Patent Number: 5,919,851
[45] Date of Patent: Jul. 6, 1999

[54] PAINT COMPOSITION AND PAINTED ARTICLE

[75] Inventors: Seitaro Yamaguchi; Koichiro Ogita; Nobuyuki Tomihashi, all of Osaka, Japan

[73] Assignee: Daikin Industries, Ltd., Osaka, Japan

[21] Appl. No.: 08/841,943

[22] Filed: Apr. 8, 1997

Related U.S. Application Data

[63] Continuation of application No. 08/507,460, filed as application No. PCT/JP94/02234, Dec. 26, 1994, abandoned.

[30] Foreign Application Priority Data

Dec. 28, 1993 [JP] Japan ..................................... 5-338506
Jul. 18, 1994 [JP] Japan ..................................... 6-167044

[51] Int. Cl.⁶ .................................................. C08K 5/54
[52] U.S. Cl. ...................... 524/268; 524/269; 524/366; 524/560; 524/601; 524/758; 523/425
[58] Field of Search ................................. 524/268, 269, 524/366, 606, 758, 560, 601; 523/425

[56] References Cited

U.S. PATENT DOCUMENTS

| | | | |
|---|---|---|---|
| 3,979,352 | 9/1976 | Brady et al. | 524/767 |
| 4,123,409 | 10/1978 | Kaelble | 260/29.15 B |
| 4,208,496 | 6/1980 | Bergfeld et al. | 524/393 |
| 4,792,357 | 12/1988 | Bier | 524/444 |
| 4,826,905 | 5/1989 | Itoh et al. | 524/366 |
| 5,441,771 | 8/1995 | Seltmann et al. | 528/44 |

FOREIGN PATENT DOCUMENTS

| | | |
|---|---|---|
| 57-14986 | 3/1982 | Japan . |
| 57-49676 | 3/1982 | Japan . |
| 60-137974 | 7/1985 | Japan . |
| 61-254675 | 11/1986 | Japan . |
| 62-252477 | 11/1987 | Japan . |
| 62-275174 | 11/1987 | Japan . |
| 1-197533 | 8/1989 | Japan . |
| 1-289896 | 11/1989 | Japan . |
| 2-169067 | 6/1990 | Japan . |
| 4-145041 | 5/1992 | Japan . |
| 5-38028 | 6/1993 | Japan . |

*Primary Examiner*—Andrew E. C. Merriam
*Attorney, Agent, or Firm*—Varndell Legal Group

[57] ABSTRACT

A paint composition comprising, as a leveling agent, 0.01 to 3.0 parts by weight of a polyfluorinated carbon chain-containing compound and 0.01 to 3.0 parts by weight of a silicone oil per 100 parts by weight of a film forming component and being capable of forming a film being excellent in water- and oil-repelling property and stain resistance, and painted articles being excellent in water- and oil-repelling property and stain resistance can be provided.

5 Claims, No Drawings

PAINT COMPOSITION AND PAINTED ARTICLE

CROSS-REFERENCE TO RELATED APPLICATIONS

This application is a continuation of U.S. Ser. No. 08/507,460, filed Aug. 25, 1995, now abandoned, which is a U.S. national phase application of International Application No. PCT/JP94/02234, filed Dec. 26, 1994.

TECHNICAL FIELD

The present invention relates to a paint composition and a painted article being excellent in water- and oil-repelling property and stain resistance.

BACKGROUND ART

There is a case where a coating having water- and oil-repelling property, stain resistance and non-tackifying property is required to prevent contamination of surfaces of electric devices for home use, office apparatuses, automobiles, building products and the like. In order to impart these surface properties, a polymer having a perfluoroalkyl group is applied to paints. For example, there are reported a method wherein a polymer having a perfluoroalkyl group is admixed with paints for general use (JP-A-96659/1983) and a method wherein a paint comprises a polymer having a perfluoroalkyl group as a main component (JP-B-32872/1989), but the stain resistance thereof is not enough.

JP-A-175386/1992 discloses a water- and oil-repelling paint composition prepared by adding a water- and oil-repelling agent containing a fluoroacrylic resin to a film forming resin comprising a urethane resin component and a silicone resin component, but there is no description as regards stain resistance. The paint composition of that invention has a disadvantage that because a large amount of the water- and oil-repelling agent is added, so-called the cissing is easy to occur at the time of coating and thus uniform coating is difficult to obtain. Generally, if a water- and oil-repelling agent comprising, as a main component, a polymer having a perfluoroalkyl group is mixed in a paint, cissing is easy to occur at the time of coating due to poor compatibility of the water- and oil-repelling agent with the paint, and a uniform coating is difficult to obtain. Also, in case of a coating having an acrylic resin or a polyester resin as a main component and being crosslinked with a melamine resin or an isocyanate type curing agent, it is known that when a crosslinking density is raised to increase hardness of the coating, stain resistance is enhanced, but water- and oil-repelling property is not good.

In JP-B-21686/1985, a paint composition comprising solvent soluble fluorine-containing copolymers having hydroxyl group is disclosed. However, these solvent soluble fluorine-containing copolymers having hydroxyl group are poor in oil-repelling property and stain resistance because of a low fluorine atom content. Also, JP-A-199211/1988 proposes a paint composition comprising a solvent soluble fluorine-containing copolymer having curable moieties and a perfluoroalkyl containing alcohol or a fluorosilicone compound. Though there is oil-repelling property on the surface of the coating, in a stain resistance test using a red ink, which is referred to hereinafter, there occurs a problem that after drying of the red ink, there remains marks of an oil droplet which cannot be wiped off completely.

An object of the present invention is to provide a paint composition being capable of forming a coating being excellent in both water- and oil-repelling property and stain resistance, and to provide a painted article.

DISCLOSURE OF THE INVENTION

The present inventors have repeatedly studied in order to accomplish the above-mentioned objects, and as a result, have found that when a polyfluorinated carbon chain-containing compound and a silicone oil are added, as a leveling agent, to a paint, a paint composition being capable of forming a coating excellent in both water- and oil-repelling property and stain resistance can be obtained, and then the present invention has been completed.

That is to say, the present invention relates to the paint composition comprising 0.01 to 3.0 parts (part by weight, hereinafter the same) of a polyfluorinated carbon chain-containing compound and 0.01 to 3.0 parts of a silicone oil as a coating modifying agent per 100 parts of a film forming component, and also relates to a painted article coated with the paint composition.

BEST EMBODIMENTS FOR CARRYING OUT THE INVENTION

The polyfluorinated carbon chain-containing compound to be used as one of the coating modifying agent may be a polymer or an unpolymerized one, and examples thereof are (1) a fluorine-containing surfactant, (2) a fluorine-containing oil, (3) a polymer having perfluoroalkyl group, (4) a fluorosilicone oil, and the like.

(1) The fluorine-containing surfactant is a surfactant containing perfluoroalkyl group or perfluoroalkylene group, and is classified into ① an anionic fluorine-containing surfactant, ② a cationic fluorine-containing surfactant, ③ an amphoteric fluorine-containing surfactant and ④ a nonionic fluorine-containing surfactant as mentioned below, but is not limited thereto.

① Anionic fluorine-containing surfactant i) -COOM type

RfCOOM, RfYCOOM,

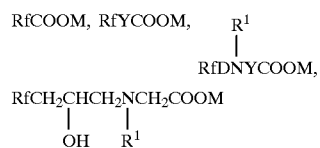

RfCH$_2$CHCH$_2$NCH$_2$COOM
　　　|　　|
　　OH　R$^1$ ii) -OSO$_3$M type

RfDNR$^1$YOSO$_3$M iii) -SO$_3$M type

RfDNR$^1$YSO$_3$M, RfSO$_3$M, RfCH$_2$OYSO$_3$M,

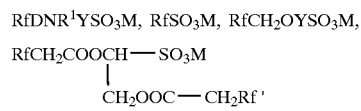

wherein, each of Rf and Rf' is a fluoroalkyl group obtained by substituting a part or a whole of hydrogen atoms of an alkyl group by fluorine atom, D is —CO—, —SO$_2$— or —(CH$_2$)$_z$— (z is an integer of 1 to 10), Y is a C$_1$ to C$_6$ alkylene group, M is hydrogen atom, NH$_4$, an alkali metal or an alkaline earth metal, and R$^1$ is hydrogen atom or a lower alkyl group.

② Cationic fluorine-containing surfactant
i) —NR$^1$R$^2$.HX type
RfDNHYNR$^1$R$^2$.HX ii)
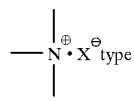

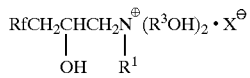

wherein, Rf, D, R$^1$, and Y are the same as defined above, R$^2$ is the same as R$^1$, R$^3$ is a C$_2$ or C$_3$ alkylene group, HX is an acid, and X is a halogen atom or an acid radical.

③ Amphoteric fluorine-containing surfactant

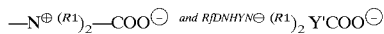

wherein, Rf, D, R$^1$ and Y are the same as defined above, and Y' is a C$_2$ to C$_6$ alkylene group.

④ Nonionic fluorine-containing surfactant
i) —OH type

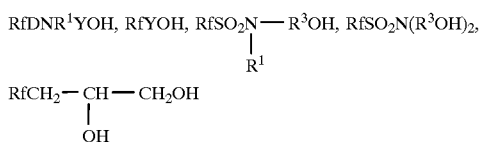

ii) —O— type

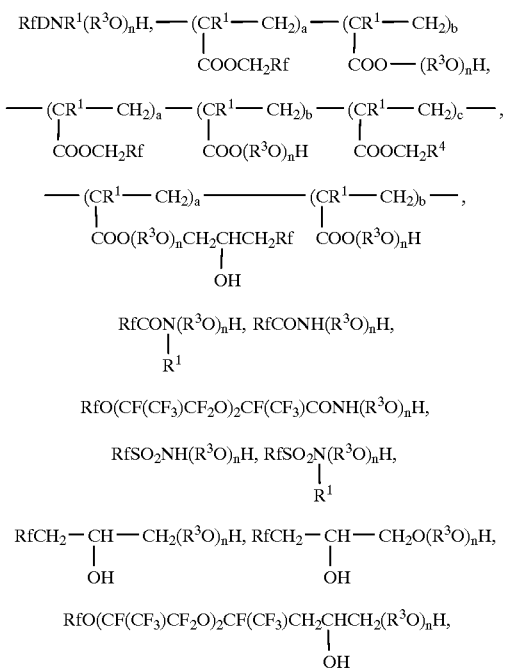

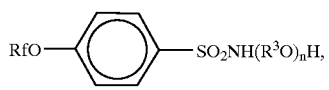

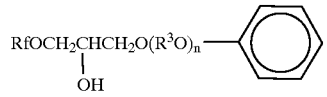

wherein, Rf, D, R$^1$, R$^3$ and Y are the same as defined above, R$^4$ is a C$_1$ to C$_{22}$ alkyl group, n is an integer of 1 to 30, and each of a, b and c is an integer of 1 to 100.

As a commercially available surfactant, there are UNI-DYNE DS-101, DS-202, DS-301, DS-406 from Daikin Industries, Ltd. and the like.

(2) As the fluorine-containing oil, there are polymers of a perfluoropolyether or chlorotrifluoroethylene, other specific fluorinated hydrocarbon compounds or the like. Examples thereof are compounds represented by the following formulae, but are not limited thereto.

F(CF$_2$CF$_2$CF$_2$O)$_p$—CF$_2$CF$_2$—L,
L—(CFClCF$_2$)$_p$—L

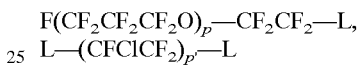

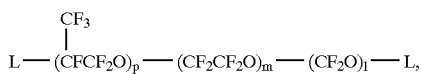

F—(CF$_2$CF$_2$CF$_2$O)$_p$—(CHFCF$_2$CF$_2$O)$_m$—CF$_2$CF$_2$—L,
F—(CF$_2$CF$_2$CF$_2$O)$_p$—(CHFCF$_2$CF$_2$O)$_m$—(CH$_2$CF$_2$CF$_2$O)$_l$CF$_2$CF$_2$—L,
L—CF$_2$CF$_2$O—(CF$_2$CF$_2$CF$_2$O)$_p$—(CF$_2$)$_m$—(OCF$_2$CF$_2$CF$_2$)$_l$OCF$_2$CF$_2$—L,
F—(CH$_2$CF$_2$CF$_2$O)$_2$—CH$_2$CF$_2$—L  F—(CF$_2$CF$_2$CF$_2$O)$_p$—(CF$_2$CF$_2$)$_l$—(CH$_2$CH$_2$)$_m$—L,
F—(CF$_2$CF$_2$CF$_2$O)$_p$—(CFClCF$_2$CF$_2$O)$_m$—CF$_2$CF$_2$—L,
L—(CH$_2$CH$_2$)$_k$—(CF$_2$CF$_2$)$_o$—(CF$_2$CF$_2$CF$_2$O)$_p$—(CF$_2$CF$_2$)$_m$—(CH$_2$CH$_2$)$_l$—L (k, l, m, o and p are an integer of 0 to 200, and p' is n integer of 1 to 20) wherein, L=(A)$_q$—(B)$_r$—(C)$_s$ (q, r and s are 0 or 1)

A:

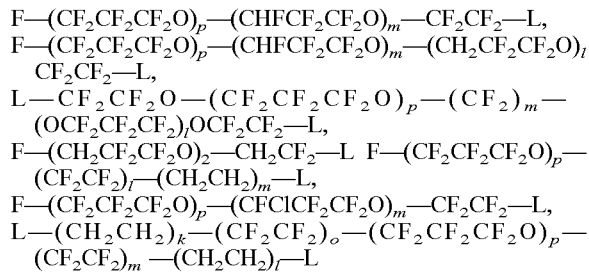

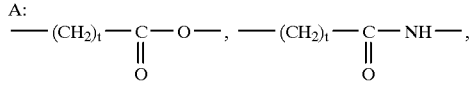

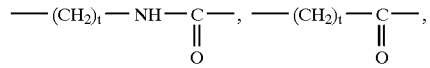

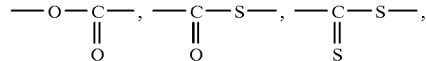

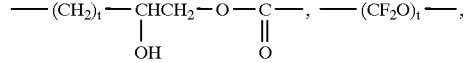

(t is an integer of 0 to 100)

B:

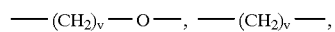

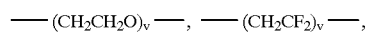

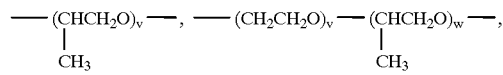

-continued

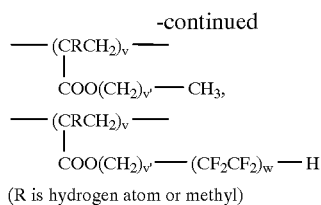

(R is hydrogen atom or methyl)

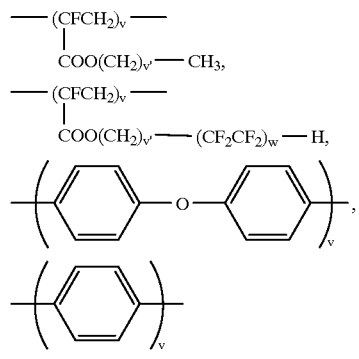

(v', v and w are an integer of 1 to 100)

C:

—H,  —F,  —Cl,  —Br,  —I,  —NH$_2$,  —NCO,

—NO$_2$,  —CN,  —SH,  —NCS,  —OH,  —COOH,

—SO$_3$H,  —CH$_3$,  —POOH,  —NR$^5$R$^6$,  —CHR$^5$R$^6$,

—(CH$_2$)$_d$—CF$_2$CF$_3$,  —(CF$_2$CF$_2$)$_u$—H,

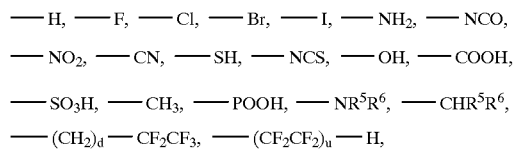

(R$^5$ and R$^6$ are phenyl, cyclohexyl or a C$_1$ to C$_{10}$ alkyl group)

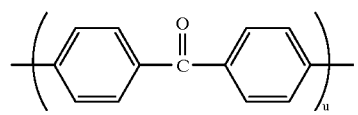

(u and d are an integer of 1 to 10).

As a commercially available fluorine-containing oil, there are DEMNUM S-20 and DAIFLOIL #20 from Daikin Industries, Ltd. and the like, Examples of the other specific fluorinated hydrocarbon compounds are those represented by the following formulae [IV] to [VIII]. The symbols representing the kinds and the number of substituents in the following formulae [IV] to [XXVII] are explained in each item explaining the respective formulae and are effective only for the formula [IV] to [XXVII].

Formula [IV]

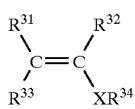

Formula [V] (R$^{35}$O)$_d$R$^{36}$

Formula [VI] (R$^{40}$OCH$_2$)$_n$R$^{42}$ (CH$_2$OR$^{41}$)$_m$

Formula [VII]

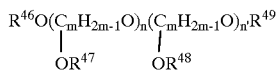

Formula [VIII]

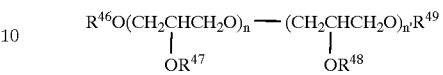

The structures of the compounds and the processes for preparing them are explained hereinbelow for respective formulae.

Compound represented by Formula [IV]

R$^{31}$, R$^{32}$ and R$^{33}$ in the formula [IV] represent fluorine atom or a linear or branched alkyl or alkenyl group having 1 to 30, preferably 1 to 10, more preferably 1 to 5 carbon atoms and being fluorinated partly or completely (which may be partly substituted by a halogen atom other than fluorine atom).

Wherein, "being fluorinated partly or completely" means a substituent having a structure such that a part or a whole of hydrogen atoms of an alkyl group or an alkenyl group are substituted by fluorine atoms, and "may be partly substituted by a halogen atom other than fluorine atom" means that there are encompassed substituents having a structure such that a part or a whole of the remaining hydrogen atoms of the partly fluorinated alkyl group or alkenyl group are substituted by a halogen atom other than fluorine atom.

As the substituents corresponding to R$^{31}$, R$^{32}$ and R$^{33}$, there are, for example, a linear or branched fluoroalkyl group having saturated structure, a linear or branched fluoroalkenyl group having unsaturated structure and the like.

Among the compounds represented by the formula [IV] (hereinafter may be referred to as compound [IV]), those having a fluoroalkyl group or a fluoroalkenyl group having a ratio of the number of fluorine atoms/the number of carbon atoms of not less than 0.6, preferably not less than 1, more preferably not less than 1.5 as the substituents corresponding to R$^{31}$, R$^{32}$ and R$^{33}$ are suitable, particularly for a freezer oil and a lubricant for magnetic recording media and are useful as a paint modifying agent because they are soluble in an organic liquid for general uses.

Examples of the substituents corresponding to R$^{31}$, R$^{32}$ and R$^{33}$ are shown hereinbelow. They are preferable from a point that the starting materials thereof for industrial production are easily obtained, but do not restrict the present invention.

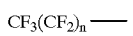

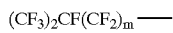

(n is an integer of 0 to 2)
(m is an integer of 0 to 2)

R$^{34}$ in the formula [IV] represents a linear or branched alkyl or alkenyl group (which may be substituted partly by a halogen atom) having 1 to 30, preferably 5 to 25, more preferably 10 to 20 carbon atoms or a polyether group (which may be substituted partly by a halogen atom) having 2 to 500, preferably 10 to 300, particularly preferably 20 to 200 carbon atoms.

Wherein, "may be substituted partly by a halogen atom" means that there are encompassed substituents having a structure such that a part of hydrogen atoms of the alkyl group, the alkenyl group or the polyether group is substituted by a halogen atom.

Also, the substituent represented by $R^{34}$ encompasses a substituent obtained by substituting a part of hydrogen atoms of the alkyl group, the alkenyl group or the polyether group by a substituent other than the halogen atom. In this regard, examples of the substituents other than the halogen atom are hydroxyl, thiol, alkoxyl, nitrile, nitro, ether, thioether, ester, carbonyl, sulfonyl, sulfinyl, carboxyl, carboxylate, amino, thiocarbamate, amide, imide, phosphine, phosphorous ester and the like.

Accordingly, as the substituent corresponding to $R^{34}$, when forming a polyether group (polyalkylene glycol group), there can be also used a polyalkylene glycol having an end group modified by various alkoxyl groups, as a starting material (precursor). In this case, as the polyalkylene glycol used as the starting material, one having a kinetic viscosity at 40° C. in the range of 1 to 500 cst, preferably 3 to 350 cst, more preferably 5 to 200 cst is suitable.

Examples of the substituents corresponding to $R^{34}$ are shown hereinbelow. They are preferable from a point that the starting materials thereof are easy to obtain for industrial production, but do not restrict the present invention.

$C_nH_{2n+1}$— (n=integer of 1 to 10)
$C_mH_{2m-1}$— (m=integer of 10 to 30)
$C_hH_{2h-3}$— (h=integer of 10 to 30)
$CH_3(OCH_2CH_2)_i$— (i=integer of 1 to 10)

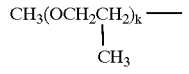

(k = integer of 1 to 100)

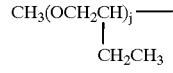

(j = integer of 1 to 100)

X in the formula [IV] represents oxygen atom or sulfur atom.

Preparation Method of Compound [IV]

The compound [IV] can be synthesized through various methods. As a typical preparation method, there is one for synthesizing by the reaction represented by the following reaction scheme [A].

Reaction scheme [A]

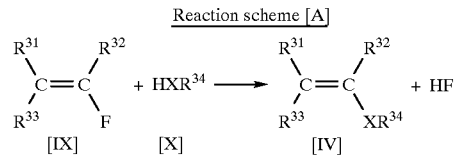

$R^{31}$, $R^{32}$, $R^{33}$, $R^{34}$ and X in the reaction scheme [A] correspond to those in the formula [IV], respectively and are as defined the same.

The starting compound [IX] can be selected depending on the combination of substituents corresponding to $R^{31}$, $R^{32}$ and $R^{33}$ of the desired compound [IV], and the examples thereof are shown below. They are preferable from a point of being easily obtained, but do not restrict the present invention.

$CF_3CF=CF_2$ [Hexafluoropropene]
$(CF_3)_2CFCF=CFCF_3$ [Dimer of hexafluoropropene, D-1]
$(CF_3)_2C=CFCF_2CF_3$ [Dimer of hexafluoropropene, D-2]
$(CF_3)_2CFCF=C(CF_3)CF_2CF_2-CF_3$ [Trimer of hexafluoropropene, T-1]
$((CF_3)_2CF)_2C=CFCF_3$ [Trimer of hexafluoropropene, T-2]

The starting compound [X] can be selected depending on the combination of substituents corresponding to $R^{34}$ and X of the desired compound [IV], and the examples thereof are shown below. These are preferable from a point that they are easy to obtain, but do not restrict the present invention.

Linear or branched higher alcohol
n-$C_{10}$ to $_{20}$ $H_{21}$ to $_{41}$ OH
i-$C_{10}$ to $_{20}$ $H_{21}$ to $_{41}$ OH provided that a pure one and a mixture of ones having the different number of carbon atoms are also encompassed.

Linear or branched higher alkenyl alcohol
n-$C_{10}$ to $_{20}$ $H_{19}$ to $_{39}$ OH
i-$C_{10}$ to $_{20}$ $H_{19}$ to $_{39}$ OH
n-$C_{10}$ to $_{20}$ $H_{17}$ to $_{37}$ OH
i-$C_{10}$ to $_{20}$ $H_{17}$ to $_{37}$ OH provided that a pure one and a mixture of ones having the different number of carbon atoms are also encompassed.

Coconut alkyl alcohol Linear or branched higher thiol
n-$C_{10}$ to $_{20}$ $H_{21}$ to $_{41}$ OH
i-$C_{10}$ to $_{20}$ $H_{21}$ to $_{41}$ OH provided that a pure one and a mixture of ones having the different number of carbon atoms are also encompassed.

(Terminus-modified) polyethylene glycol
(Terminus-modified) polypropylene glycol
(Terminus-modified) polybutylene glycol The above-mentioned reaction can be carried out in a solvent or without using a solvent. In case of using the solvent, it is preferable that an amount thereof in volume is 0.1 to 100 times, preferably 0.5 to 10 times, more preferably 1 to 5 times the total amount of the starting compound [IX] and the starting compound [X]. As the usable solvents, there are, for example, an aprotic polar solvent, and examples thereof are methyl ethyl ketone, acetone, DMF, DMSO, NMP, sulforan, diglyme, triglyme, ether, THF, chloroform, dichloromethane and the like.

In the above-mentioned reaction, as a catalyst or as a scavenger in case where a by-product HF is generated in the above-mentioned reaction, there can be used a basic catalyst. In this case, it is preferable that the basic catalyst is used in an amount of 0.001 to 10 equivalents, preferably 0.01 to 5 equivalents, more preferably 0.1 to 2 equivalents with respect to any of the starting compounds of [IX] and [X]. Examples of the basic catalyst are inorganic bases such as KOH, NaOH, $K_2CO_3$ and $Na_2CO_3$, organic bases such as triethylamine and tributylamine and the like.

It is preferable that the reaction temperature of the above-mentioned reaction is from −10° to 200° C., preferably from 0° to 150° C., particularly preferably from 0° to 100° C. In this case, the reaction can be carried out under the reaction pressure of 0 to 50 kg/cm²G, preferably 0 to 20 kg/cm²G, particularly preferably 0 to 10 kg/cm²G. It is preferable that the reaction time is from 30 minutes to 100 hours, preferably from 2 to 50 hours.

It is preferable that the mixing ratio of the starting compound [IX] to the starting compound [X] in the above-mentioned reaction, namely [IX]/[X] equivalent ratio is from 0.01 to 20, preferably from 0.5 to 10, more preferably from 0.5 to 3.

It is possible to carry out the reaction by charging each compound to be used as the starting materials, batchwise or by adding dropwise or blowing one compound into another compound.

There is no specific treating method after the reaction, that is, as a method to recover the compound [IV] from the reaction solution. Purification can be done by a usual method. For instance, the compound [IV] can be recovered by quenching the reaction solution in a large amount of water, extracting with a solvent incompatible with water (CFC113 (hereinafter referred to as S-3), dichloromethane, chloroform and the like), washing with an acid, alkali, saturated saltwater and the like, drying with anhydrous sodium sulfate or anhydrous magnesium sulfate, and then after the filtration, distilling off the solvent from the filtrate under a reduced pressure. If necessary, it is possible to purify further by distilling under a reduced pressure, by column chlomatography or the like.

Compound represented by Formula [V]

d in the formula [V] is 1 or 2.

$R^{35}$ in the formula [V] is a partly or completely fluorinated linear or branched alkyl group, alkenyl group or alkoxyalkyl group having 1 to 50, preferably 1 to 35, more preferably 2 to 26 carbon atoms (which may be partly substituted by a halogen atom other than fluorine atom or may have 1 to 3 OH groups in its structure) or a partly or completely fluorinated fluoropolyether group having 2 to 700, preferably 3 to 800, more preferably 5 to 150 carbon atoms (which may be partly substituted by a halogen atom other than fluorine atom, may have 1 to 3 unsaturated bonds in its structure or may have ether bond at its side chain).

Wherein, "partly or completely fluorinated" means a substituent obtained by substituting a part or a whole of hydrogen atoms of the alkyl group, alkenyl group or alkoxyalkyl group by fluorine atoms, or a fluoropolyether group having at least one fluorine atom in its molecule, and "may be partly substituted by a halogen atom other than fluorine atom" and "may have 1 to 3 OH groups in its structure" mean that there are encompassed a substituent obtained by substituting a part or a whole of hydrogen atoms remaining in the partly fluorinated alky group, alkenyl group or alkoxyalkyl group by a halogen atom other than fluorine atom or by substituting 1 to 3 hydrogen atoms by OH groups, and also a fluoropolyether group having a halogen atom other than fluorine atom in its molecule. Also, "may have 1 to 3 unsaturated bonds in its structure" means that there are encompassed not only a saturated (having neither a carbon—carbon double bond nor a triple bond) fluoropolyether group but also a fluoropolyether group having 1 to 3 carbon—carbon double bonds and triple bonds in total per one substituent in the structure, even if it is an unsaturated fluoropolyether group. Further, "may have ether bond at its side chain" means that there are encompassed not only a fluoropolyether group having ether bond at a trunk chain but also a fluoropolyether group having ether bond at side chain.

As the substituent corresponding to $R^{35}$, there are, for example, a linear or branched fluoroalkyl group or hydroxyfluoroalkyl group having saturated structure, a linear or branched fluoroalkenyl group or hydroxyfluoroalkenyl group having unsaturated structure and the like.

Among the compounds [V], those having, as a substituent corresponding to $R^{35}$, a fluoroalkyl group, fluoroalkenyl group, fluoroalkoxyalkyl group or fluoropolyether group which has a ratio of the number of fluorine atoms/the number of carbon atoms of not less than 0.6, preferably not less than 1, particularly preferably not less than 1.5, are suitable, particularly for a freezer oil and a lubricant for magnetic recording medium and are useful as a paint modifying agent because they are soluble in an organic liquid for general uses.

Examples of substituents corresponding to $R^{35}$ are shown hereinbelow. These are preferable from a point that the starting materials thereof for industrial production are easy to obtain, but the present invention is not limited thereto.

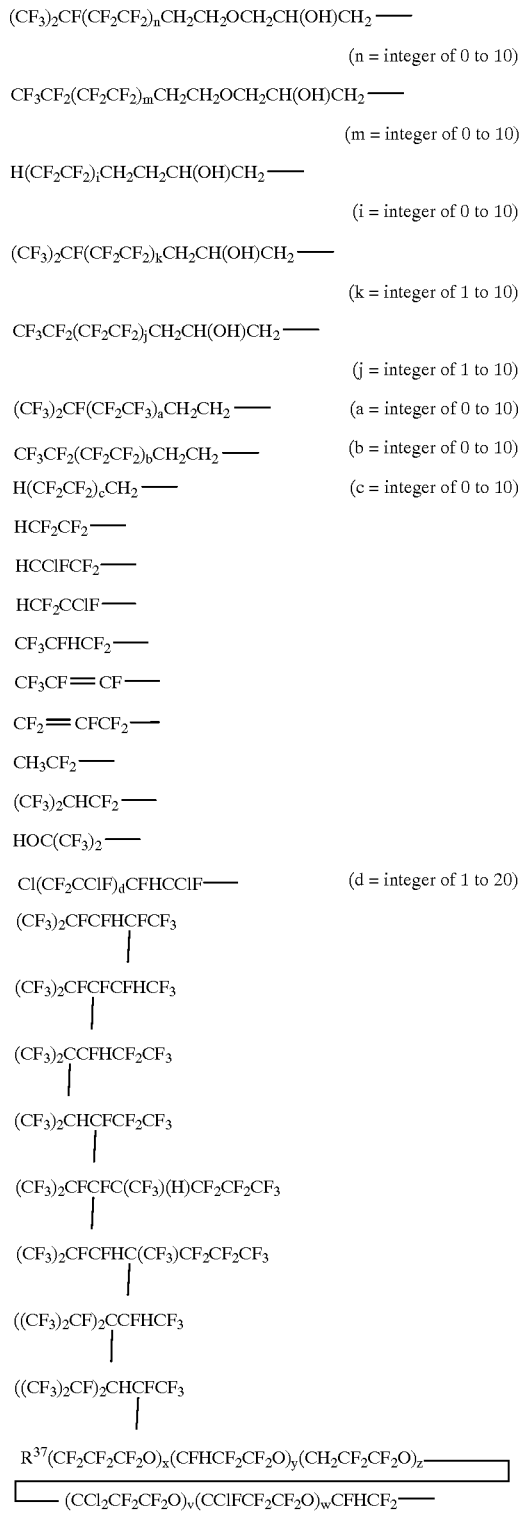

provided that x, y, z, v and w are an integer of 0 to 100, and all of them are not 0 at the same time. $R^{37}$ is a halogen atom or an alkoxyl group having 1 to 3 carbon atoms (which may be partly or completely fluorinated).

provided that p, q and r are an integer of 0 to 100, and all of them are not 0 at the same time. $R^{38}$ is a halogen atom or an alkoxyl group having 1 to 3 carbon atoms (which may be partly or completely fluorinated).

A fluoropolyether group corresponding to $R^{35}$ can be formed by using a fluoropolyether as a starting material (precursor) which has, at its trunk chain structure, a corresponding perfluoropolyether, a fluoropolyether fluorinated not completely or a halogenated fluoropolyether partly substituted by other halogen atom. Examples (manufacturer and trade name) of the fluoropolyether to be used as the starting material are shown hereinbelow. These are ones commercially available, and are ones preferable from a point that they are easy to obtain, but the present invention is not limited thereto. Demnum available from Daikin Industries, Ltd.

Krytox available from Du Pont

Fombline Y available from Montefluos

Fombline Z available from Montefluos

Fombline K available from Montefluos

Barierta available from NKL Klueber

As the fluoropolyether used as the starting material, ones having a ratio of the number of fluorine atoms/the number of carbon atoms of not less than 0.6, preferably not less than 1, particularly preferably not less than 1.5 is suitable.

When d in the formula [V] is 1, $R^{36}$ shows monofunctional group, and concretely represents a linear or branched alkyl group or alkenyl group which may be partly substituted by a halogen atom and has 1 to 30, preferably 1 to 10, more preferably 1 to 5 carbon atoms, or a polyether group which may be partly substituted by a halogen atom and has 2 to 500, preferably 10 to 300, more preferably 20 to 200 carbon atoms.

The substituents corresponding to $R^{36}$ encompasses one having a structure substituted by a substituent other than a halogen atom. As the substituents other than a halogen atom, there are hydroxyl, thiol, alkoxyl, nitrile, nitro, ether, thioether, ester, carbonyl, sulfonyl, sulfinyl, carboxyl, carboxylate, amino, thiocarbamate, amide, imide, phosphine, phosphorous ester and the like.

When d in the formula [V] is 1, as the substituent corresponding to $R^{36}$, when forming a polyether group (polyalkylene glycol group), there can also be used a polyalkylene glycol having an end group modified by various alkoxyl groups, as the starting material (precursor). In this case, a suitable polyalkylene glycol used as the starting material is one having a kinetic viscosity at 40° C. in the range of 1 to 500 cst, preferably 3 to 350 cst, more preferably 5 to 200 cst.

Examples of a monofunctional group corresponding to $R^{35}$ are shown hereinbelow. These are preferable from a point that they are easy to obtain for industrial production, but the present invention is not limited thereto.

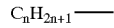  (n = integer of 10 to 30)

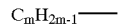  (m = integer of 10 to 30)

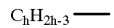  (h = integer of 10 to 30)

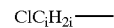  (i = integer of 1 to 10)

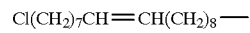

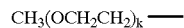  (k = integer of 1 to 100)

-continued

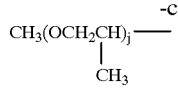  (j = integer of 1 to 100)

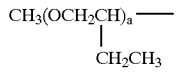  (a = integer of 1 to 100)

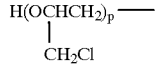  (a = integer of 1 to 100)

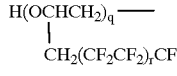

(q = integer of 1 to 100 and r = integer of 0 to 10)

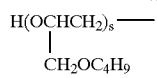  (s = integer of 1 to 100)

When d in the formula [V] is 2, $R^{36}$ is a bifunctional group, and concretely represent a linear or branched bifunctional alkyl group or bifunctional alkenyl group having 1 to 10 carbon atoms or a bifunctional polyether group having 2 to 500, preferably 10 to 300, more preferably 20 to 200 carbon atoms. The substituents corresponding to $R^{36}$ encompass a bifunctional group having a structure wherein a part of hydrogen atoms of these bifunctional groups is substituted by a halogen atom or a bifunctional group substituted by a substituent other than a halogen atom. As the substituents other than a halogen atom, there are hydroxyl, thiol, alkoxyl, nitrile, nitro, ether, thioether, ester, carbonyl, sulfonyl, sulfinyl, carboxyl, carboxylate, amino, thiocarbamate, amide, imide, phosphine, phosphorous ester and the like.

When d in the formula [V] is 2, as the substituent corresponding to $R^{36}$, when forming a bifunctional polyether (bifunctional polyalkylene glycol), there can also be used a polyalkylene glycol having an end group modified by various alkoxyl groups, as the starting material (precursor). In this case, as the polyalkylene glycol used as the starting material, one having a kinetic viscosity at 40° C. in the range of 1 to 500 cst, preferably 3 to 350 cst, more preferably 5 to 200 cst is suitable.

Examples of the bifunctional group corresponding to $R^{36}$ are shown hereinbelow. These are preferable from a point that they are easy to obtain for industrial production, but the present invention is not limited thereto.

  (h = integer of 1 to 10)

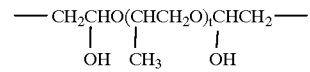  (t = integer of 1 to 100)

Preparation Method of Compound [V]

The compound [V] can be prepared through various methods.

For example, as the typical methods to synthesize the compound [V] wherein $R^{35}$ corresponds to any of the following substituents:

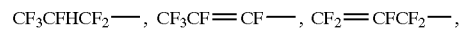

  (i = integer of 1 to 20),

-continued

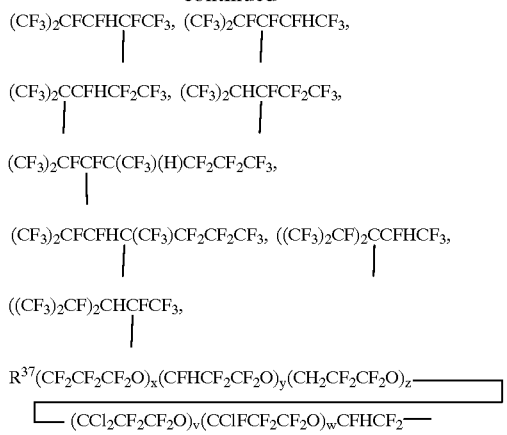

provided that x, y, z, v and w are an integer of 0 to 100 and all of them are not 0 at the same time, $R^{37}$ is a halogen atom or an alkoxyl group (which may be partly or completely fluorinated) having 1 to 3 carbon atoms, or

provided that p, q and r are an integer of 0 to 100 and all of them are not 0 at the same time, $R^{38}$ is a halogen atom or an alkoxyl group (which may be partly or completely fluorinated) having 1 to 3 carbon atoms, and d in the formula [V] is 1 and $R^{35}$ corresponds to any of the following substituents:

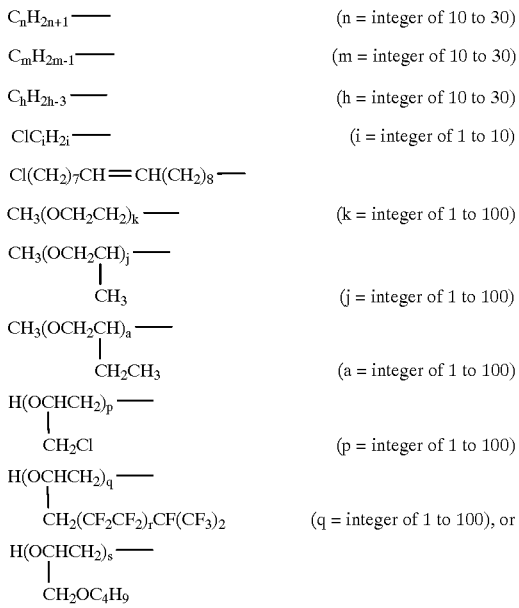

(s=integer of 1 to 100 and r=integer of 0 to 10) or d in the formula [V] is 2 and $R^{36}$ corresponds to a substituent of $-(C_hH_{2h})-$ (h=integer of 1 to 10), there are the methods shown by the following reaction scheme [B] or [C].

Reaction scheme [B]

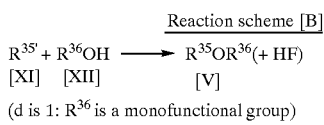

(d is 1: $R^{36}$ is a monofunctional group)

Reaction scheme [C]

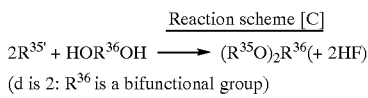

(d is 2: $R^{36}$ is a bifunctional group)

The starting compound [XI] corresponding to $R^{35}$ is a fluoroolefin or a fluoroketone mentioned below.

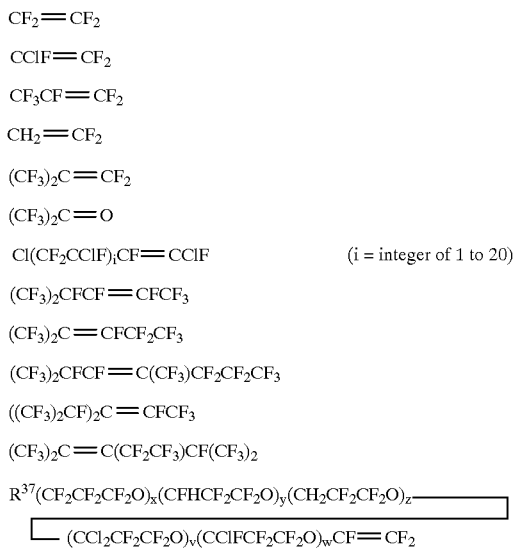

provided that x, y, z, v and w are an integer of 0 to 100 and all of them are not 0 at the same time, $R^{37}$ is a halogen atom or an alkoxyl group having 1 to 3 carbon atoms (which may be partly or completely fluorinated) or $$R^{38}(CF(CF_3)CF_2O)_p(CF_2CF_2O)_q(CF_2O)_rCF=CF_2$$

provided that p, q and r are an integer of 0 to 100 and all of them are not 0 at the same time, $R^{38}$ is a halogen atom or an alkoxyl group having 1 to 3 carbon atoms (which may be partly or completely fluorinated).

$R^{35}$ and $R^{36}$ are the same as defined above.

The starting compound [XI] can be selected depending on the substituent corresponding to $R^{35'}$ of the desired compound [V]. There are concretely many compounds [XI], for example, the following fluoroolefins and fluoroketones. These are perferable from a point that they are easy to obtain, but the present invention is not limited thereto.

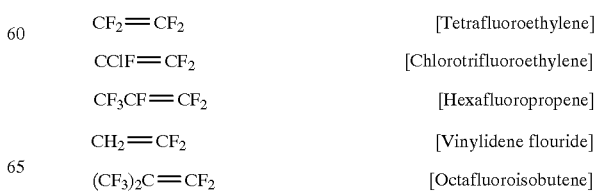

-continued (CF$_3$)$_2$C=O  [Hexafluoroacetone]

Cl(CF$_2$CClF)$_{1-20}$CF=CClF (CF$_3$)$_2$CFCF=CFCF$_3$  [Dimer of hexafluoropropene, D-1]

(CF$_3$)$_2$C=CFCF$_2$CF$_3$  [Dimer of hexafluoropropene, D-2]

(CF$_3$)$_2$CFCF=C(CF$_3$)CF$_2$CF$_2$CF$_3$

[Trimer of hexafluoropropene, T-1]

((CF$_3$)$_2$CF)$_2$C=CFCF$_3$  [Trimer of hexafluoropropene, T-2]

C$_3$F$_7$OCF=CF$_2$

C$_3$F$_7$OCF(CF$_3$)CF$_2$OCF=CF$_2$

C$_3$F$_7$O(CF(CF$_3$)CF$_2$O)$_2$CF=CF$_2$

The starting compounds [XII] and [XII'] can be selected depending on the substituent corresponding to $R^{36}$ of the desired compound [V], and the typical examples thereof are shown hereinbelow:

Compound [XI]:

Higher (branched) alcohol n-C$_{10}$ to $_{20}$ H$_{21}$ to $_{41}$ OH i-C$_{10}$ to $_{20}$ H$_{21}$ to $_{41}$ OH and the like provided that a pure one and a mixture of ones having the different number of carbon atoms are also encompassed.

Higher (branched) alkenylalcohol n-C$_{10}$ to $_{20}$ H$_{19}$ to $_{39}$ OH i-C$_{10}$ to $_{20}$ H$_{19}$ to $_{39}$ OH n-C$_{10}$ to $_{20}$ H$_{17}$ to $_{37}$ OH i-C$_{10}$ to $_{20}$ H$_{17}$ to $_{37}$ OH and the like provided that a pure one and a mixture of ones having the different number of carbon atoms are also encompassed.

Coconut alkyl alcohol

ClC$_2$H$_4$OH

Cl(CH$_2$)$_7$CH=CH(CH$_2$)$_8$OH

Compound [XII']

(Terminus-modified) polyethylene glycol (Terminus-modified) polypropylene glycol (Terminus-modified) Polybutylene glycol

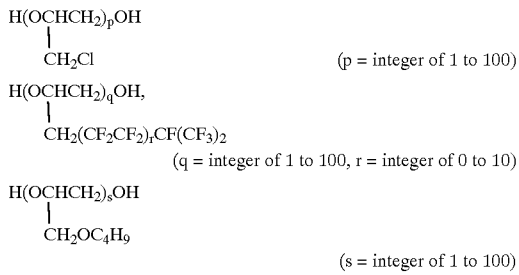

H(OCHCH$_2$)$_p$OH
|
CH$_2$Cl  (p = integer of 1 to 100)

H(OCHCH$_2$)$_q$OH,
|
CH$_2$(CF$_2$CF$_2$)$_r$CF(CF$_3$)$_2$
  (q = integer of 1 to 100, r = integer of 0 to 10)

H(OCHCH$_2$)$_s$OH
|
CH$_2$OC$_4$H$_9$
  (s = integer of 1 to 100)

HO(C$_6$H$_{12}$)OH

These reactions can be carried out in a solvent or without using a solvent. In case where the solvent is used, it is preferable that an amount thereof in volume is 0.1 to 100 times, preferably 0.5 to 10 times, more preferably 1 to 5 times the total amount of the starting compounds [XI] and [XII] or [XII']. The usable solvent is, for instance, an aprotic polar solvent, and the examples thereof are methyl ethyl ketone, acetone, DMF, DMSO, NMP, sulforan, diglyme, triglyme, ether, THF, chloroform, dichloromethane and the like.

In these reactions, as a catalyst or as a scavenger in case where a by-product HF is produced in these reactions, there can be used a basic catalyst. In this case, it is preferable to use the basic catalyst in an amount of 0.001 to 10 equivalents, preferably 0.01 to 5 equivalents, more preferably 0.1 to 2 equivalents with respect to any of the starting compounds [XI], [XII] and [XII']. Examples of the basic catalyst are inorganic bases such as KOH, NaOH, K$_2$CO$_3$ and Na$_2$CO$_3$, organic bases such as triethylamine and tributylamine and the like.

It is preferable that the reaction temperature of the above-mentioned reactions is from −10° to 200° C., preferably from 0° to 150° C., particularly preferably from 0° to 100° C. In this case, the reaction can be carried out under the reaction pressure of 0 to 50 kg/cm$^2$G, preferably 0 to 20 kg/cm$^2$G, particularly preferably 0 to 10 kg/cm$^2$G. It is preferable that the reaction time is from 30 minutes to 100 hours, preferably from 2 to 50 hours.

It is preferable that the mixing ratio of the starting compound [XI] to the starting compound [XII] or [XII'] in the above-mentioned reactions, namely, [XI]/[XII] equivalent ratio or [XI]/[XII'] equivalent ratio is from 0.01 to 20, preferably from 0.5 to 10, more preferably from 0.5 to 3.

It is possible to carry out the reactions by charging each compound to be used as the starting materials, batchwise or by adding dropwise or blowing one compound into another compound, but the present invention is not limited thereto.

There is no specific treating method after the reaction, that is, as a method to recover the compound [V] from the reaction solution. Purification can be done by a usual method. For instance, the compound [V] can be recovered by quenching the reaction solution in a large amount of water, extracting with a solvent incompatible with water (S-3, dichloromethane, chloroform and the like), washing with an acid, alkali, saturated saltwater and the like, drying with anhydrous sodium sulfate or anhydrous magnesium sulfate, and then after the filtration, distilling off the solvent from the filtrate under a reduced pressure. If necessary, it is possible to purify further by distilling under a reduced pressure, by a column chlomatography or the like.

For example, as the typical method to synthesize the compound [V] wherein $R^{35}$ in the formula [V] is the same as mentioned above, d in the formula [V] is 1 and $R^{36}$ corresponds to any of the following substituents:

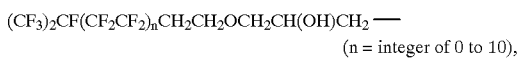

(CF$_3$)$_2$CF(CF$_2$CF$_2$)$_n$CH$_2$CH$_2$OCH$_2$CH(OH)CH$_2$—

(n = integer of 0 to 10),

CF$_3$CF$_2$(CF$_2$CF$_2$)$_m$CH$_2$CH$_2$OCH$_2$CH(OH)CH$_2$—

(m = integer of 0 to 10),

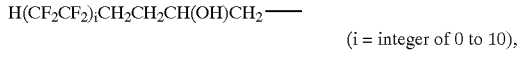

H(CF$_2$CF$_2$)$_i$CH$_2$CH$_2$CH(OH)CH$_2$—

(i = integer of 0 to 10),

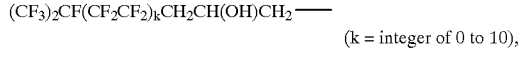

(CF$_3$)$_2$CF(CF$_2$CF$_2$)$_k$CH$_2$CH(OH)CH$_2$—

(k = integer of 0 to 10),

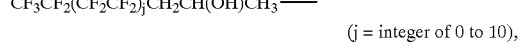

CF$_3$CF$_2$(CF$_2$CF$_2$)$_j$CH$_2$CH(OH)CH$_3$—

(j = integer of 0 to 10),

(CF$_3$)$_2$CF(CF$_2$CF$_2$)$_a$CH$_2$CH$_2$—

(a = integer of 0 to 10),

CF$_3$CF$_2$(CF$_2$CF$_2$)$_b$CH$_2$CH$_2$—

(b = integer of 0 to 10) or

H(CF$_2$CF$_2$)$_c$CH$_2$—

(c = integer of 0 to 10), or a substituent of which d in the formula [V] is 2 and $R^{36'}$ corresponds to the following substituent:

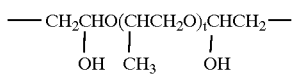

(t=integer of 1 to 100), there are the methods to synthesize the compound [V] by the reactions shown by the following reaction scheme [D] or [E].

Reaction scheme [D]

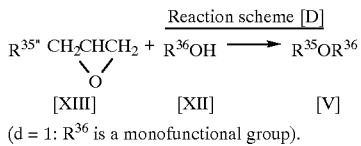

(d = 1: $R^{36}$ is a monofunctional group).

Reaction scheme [E]

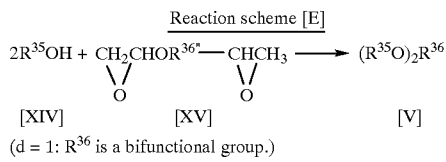

(d = 1: $R^{36}$ is a bifunctional group.)

$R^{35}$ is the following substituents.

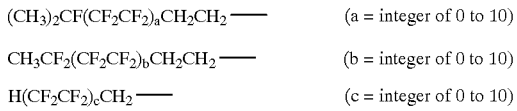

$R^{35"}$ is the following substituents.

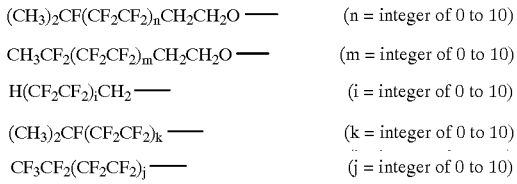

$R^{36}$ is defined in the same manner as mentioned above. $R^{36"}$ is

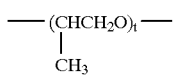

(t=integer of 0 to 100).

The starting compound [XII] is defined in the same manner as mentioned above.

Examples of the starting material [XIII] are shown below. These are preferable from a point that they are easy to obtain, but the present invention is not limited thereto.

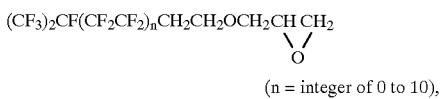

(n = integer of 0 to 10),

-continued

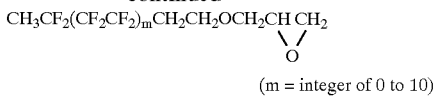

(m = integer of 0 to 10)

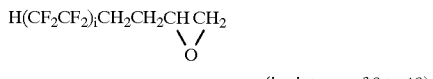

(i = integer of 0 to 10)

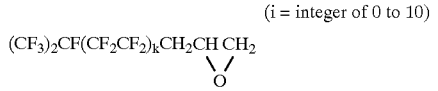

(k = integer of 0 to 10)

(j = integer of 0 to 10)

Examples of the starting material [XIV] are shown below. These are preferable from a point that they are easy to obtain, but the present invention is not limited thereto.

| | |
|---|---|
| $(CH_3)_2CF(CF_2CF_2)_aCH_2CH_2OH$ | (a = integer of 0 to 10) |
| $CH_3CF_2(CF_2CF_2)_bCH_2CH_2OH$ | (b = integer of 0 to 10) |
| $H(CF_2CF_2)_cCH_2OH$ | (c = integer of 0 to 10) |

As the examples of the starting material [XV], there is a compound:

$$CH_2CHO-(CHCH_2O)_t-CHCH_2$$
$$\underset{O}{\diagdown\diagup} \quad \underset{CH_3}{|} \quad \underset{O}{\diagdown\diagup}$$

(t=integer of 0 to 100). This compound is preferable from a point that it is easy to obtain, but the present invention is not limited thereto.

The above-mentioned reaction can be carried out in a solvent or without using a solvent. In case of using the solvent, it is preferable that an amount thereof in volume is 0.1 to 100 times, preferably 0.5 to 10 times, more preferably 1 to 5 times the total amount of the starting compound [XIII] and [XII] or the starting materials [XIV] and [XV]. As the usable solvents, there are, for example, an aprotic polar solvent. Examples thereof are methyl ethyl ketone, acetone, DMF, DMSO, NMP, sulforan, diglyme, triglyme, ether, THF, chloroform, dichloromethane and the like.

As the catalyst for these reactions, there can be used a Lewis acid catalyst. In this case, it is preferable to use the Lewis acid catalyst in an amount of 0.001 to 10 equilavents, preferably 0.01 to 5 equivalents, more preferably 0.1 to 2 equivalents with respect to a total amount of the starting compounds. As the examples of the Lewis acid catalyst, there can be mentioned a boron trifluoride, adducts of boron trifluoride with ether and the like.

It is preferable that the reaction temperature of these reactions is from −10° to 200° C., preferably from 0° to 150° C., more preferably from 10° to 100° C. In this case, the reaction can be carried out at a pressure of 0 to 10 kg/cm²G, preferably 0 to 5 kg/cm²G, particularly preferably 0 to 2 kg/cm²G. It is preferable that the reaction time is from 30 minutes to 100 hours, preferably from 2 to 50 hours.

In these reactions, it is preferable that a mixing ratio of the starting compounds [XIII] to [XII] or the ratio of [XIV] to [XV], namely, a [XIII]/[XII] equivalent ratio and a [XIV]/[XV] equivalent ratio are from 0.01 to 20, preferably from 0.5 to 10, more preferably from 0.5 to 3.

These reactions can be carried out by charging each starting material batchwise or by adding dropwise one starting material in another starting material, but the present invention is not limited to them.

There is no specific treating method after the reaction, that is, as a method to recover the compound [V] from the reaction solution. Purification can be done by a usual method. For instance, the compound [V] can be recovered by quenching the reaction solution in a large amount of water, extracting with a solvent incompatible with water (S-3, dichloromethane, chloroform and the like), washing with an acid, alkali, saturated saltwater and the like, drying with anhydrous sodium sulfate, anhydrous magnesium sulfate or the like, and then after the filtration, distilling off the solvent from the filtrate under a reduced pressure. If necessary, it is possible to purify further by distilling under a reduced pressure, by a column chlomatography or the like.

Compound represented by Formula [VI]

n in the formula [VI] is an integer of 0 to 2, m is an integer of 1 to 4, and $1 \leq n+m \leq 4$.

In the formula [VI], $R^{40}$ is hydrogen atom, or a partly or completely fluorinated linear or branched alkyl, alkenyl or alkoxyalkyl group having 1 to 50, preferably 1 to 35, more preferably 2 to 26 carbon atoms (which may be partly substituted by a halogen atom other than fluorine atom or may have 1 to 3 OH groups in its structure), or a partly or completely fluorinated fluoropolyether having 2 to 700, preferably 3 to 300, more preferably 5 to 150 carbon atoms (which may be partly substituted by a halogen atom other than fluorine atom, may have 1 to 3 unsaturated bonds in its structure or may have ether bond at its side chain).

Wherein, "being partly or completely fluorinated" means a substituent having a structure such that a part or a whole of hydrogen atoms of the alkyl group, alkenyl group or alkoxyalkyl group is substituted by halogen atoms, and a polyether group having at least one fluorine atom in its structure. And "may be partly substituted by a halogen atom other than fluorine atom" and "may have 1 to 3 OH groups in its structure" mean that there are also encompassed a substituent obtained by substituting a part or a whole of hydrogen atoms remaining in the partly fluorinated alkyl group, alkenyl group or alkoxyalkyl group by a halogen atom other than fluorine atom or by substituting 1 to 3 hydrogen atoms by hydroxyl group, and a fluoropolyether having a halogen atom other than fluorine atom in its structure. Also, "may have 1 to 3 unsaturated bonds in its structure" means that there are encompassed not only a saturated fluoropolyether (having neither a carbon-carbon double bond nor a triple bond) but also a fluoropolyether group having 1 to 3 carbon-carbon double bonds and triple bonds in total per one substitutent in the structure even in case of an unsaturated fluoropolyether group. Further "may have ether bond at its side chain" means that not only a fluoropolyether group having ether bond at a trunk chain but also a fluoropolyether group having ether bond at side chain are encompassed.

As the substituents corresponding to $R^{40}$, there are, for example, a linear or branched fluoroalkyl group or hydroxyl-containing fluoroalkyl group which has a saturated structure, or a linear or branched fluoroalkenyl group and hydroxyl-containing fluoroalkenyl group which has an unsaturated structure.

Among the compounds [VI], those having, as the substituents corresponding to $R^{40}$, a fluoroalkyl group, fluoroalkenyl group, fluoroalkoxyalkyl group or fluoropolyether group having a ratio of the number of fluorine atoms/the number of carbon atoms is not less than 0.6, preferably not less than 1, particularly preferably not less than 1.5 are suitable, particularly as a freezer oil and a lubricant for magnetic recording media and are useful as a paint modifying agent because they are soluble in an organic liquid for general uses.

Examples of the substituents corresponding to $R^{40}$ are shown hereinbelow. These are preferable from a point that starting materials for industrial production are easy to obtain. The present invention is not limited to these.

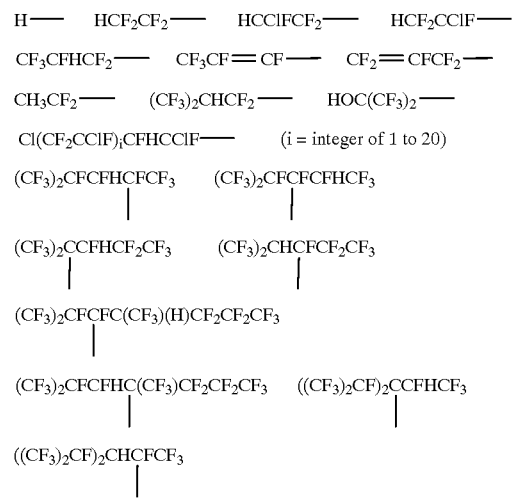

Preparation Method of Compound [VI]

The compound [VI] can be prepared through various methods.

For example, as a typical synthesizing method, there is a two step reaction method as shown by the following reaction scheme [F].

Reaction scheme [F]

First reaction:

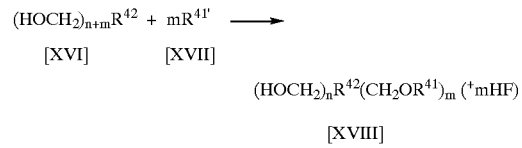

Second reaction:

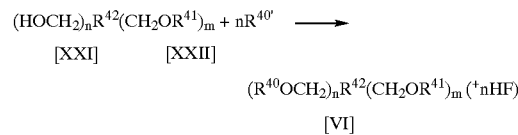

In the above scheme [F], n is an integer of 0 to 2, m is an integer of 1 to 4, and $1 \geq n+m \leq 4$.

$R^{40}$, $R^{41}$ and $R^{42}$ are the same as defined above.

The starting compound [XVII] corresponding to $R^{41'}$ can be selected depending on a substituent corresponding to $R^{41}$ of the desired compound [VI]. Also, the starting compound [XIX] corresponding to $R^{40'}$ can be selected depending on a substituent corresponding to $R^{40}$ of the desired compound [VI]. Examples thereof are fluoroolefins and fluoroketones mentioned below. These compounds are preferable from a point that they are easy to obtain, but the present invention is not limited thereto.

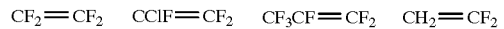
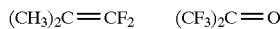
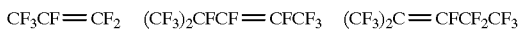
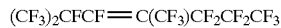
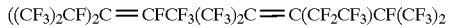

provided that x, y, z, v and w are an integer of 0 to 100, and all of them are not 0 at the same time, $R^{37}$ is a halogen atom or a $C_1$ to $C_3$ alkoxyl group which may be partly or completely fluorinated.

provided that p, q and r are an integer of 0 to 100, and all of them are not 0 at the same time, $R^{38}$ is a halogen atom or a $C_1$ to $C_3$ alkoxyl group which may be partly or completely fluorinated.

As the starting compound [XVI], there are various ones, depending on the values m and n, such as so-called hindered alcohol. This is preferable from a point of being easily obtained, but the present invention is not limited thereto. Examples of the starting compound [XVI] are as mentioned below:

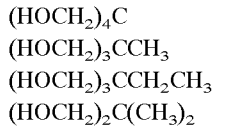

HOCH$_2$C(CH$_3$)$_3$ and the like.

As the starting compounds [XVII] and [XIX], there are a plurality of compounds as mentioned above. Examples thereof are fluoroolefins and fluoroketones as exemplified below. These fluoroolefins and fluoroketones are preferable since they are easy to obtain, but the compounds of the present invention are not limited thereto.

| | |
|---|---|
| CF$_2$=CF$_2$ | [Tetrafluoroethylene] |
| CClF=CF$_2$ | [Chlorotrifluoroethylene] |
| CF$_3$CF=CF$_2$ | [Hexafluoropropene] |
| CH$_2$=CF$_2$ | [Vinylidene fluoride] |
| (CH$_3$)$_2$C=CF$_2$ | [Octafluoroisobutene] |
| (CF$_3$)$_2$C=O | [Hexafluoroacetone] |
| Cl(CF$_2$CClF)$_{1-20}$CF=CClF | |
| (CF$_3$)$_2$CFCF=CFCF$_3$ | [Dimer of hexafluoropropene, D-1] |
| (CF$_3$)$_2$C=CFCF$_2$CF$_3$ | [Dimer of hexafluoropropene, D-2] |
| (CF$_3$)$_2$CFCF=C(CF$_3$)CF$_2$CF$_2$CF$_3$ | [Trimer of hexafluoropropene, T-1] |
| ((CF$_3$)$_2$CF)$_2$C=CFCF$_3$ | [Trimer of hexafluoropropene, T-2] |
| C$_3$F$_7$OCF=CF$_2$ | |
| C$_3$F$_7$OCF(CF$_3$)CF$_2$OCF=CF$_2$ | |
| C$_3$F$_7$O(CF(CF$_3$)CF$_2$O)$_8$CF=CF$_2$ | |

The compound [XVIII], which is the same as in the formula [VI] except that $R^{40}$ corresponds to hydrogen atom, can be obtained by reducing a mixing ratio of the starting compound [XVII] to [XVI] in the first reaction, that is, a [XVII]/[XVI] equivalent ratio and by shortening the reaction time and terminating the reaction prior to completely finishing the reaction.

The compound [VI] having substituents corresponding to $R^{40}$ and $R^{41}$ which are different in the structure from each other, can be obtained by using a fluoroolefin having a structure different from that of the starting material [VII] in the first reaction, as the starting material [XIX] in the second reaction.

The compound [VI] having substituents corresponding to $R^{40}$ and $R^{41}$ which are different in the structure from each other, can be obtained by completely reacting the hydroxyl group of the starting material [XVI] throughout the reaction in one step of the first reaction, that is, only by the first reaction, or by reacting completely the hydroxyl group of the starting material [XVI] by conducting the first and second reactions with the same fluoroolefin for the starting materials [XVII] and [XIX] in the first and second reactions without discriminating each reaction.

It is practically difficult to carry out each reaction by completely discriminating from each other, and also there is no problem even if the product is a mixture of various compounds. However, if the obtained compound [VI] is used for a freezer oil, one having a high volume resistance and low water absorption property is preferable. For instance, compounds having a hydroxyl value of not more than 80, preferably not more than 50, more preferably not more than 30 are preferable.

The first and second reactions can be carried out fundamentally under the same conditions. These reactions can be conducted in a solvent or without using a solvent. In case of using the solvent, it is preferable that an amount thereof in volume is 0.1 to 100 times, preferably 0.5 to 10 times, more preferably 1 to 5 times the total amount of the compounds used as the starting materials. As the usable solvents, there are, for example, an aprotic polar solvent. Examples thereof are methyl ethyl ketone, acetone, DMF, DMSO, NMP, sulforan, diglyme, triglyme, ether, THF, chloroform, dichloromethane and the like.

In the above-mentioned reactions, as a catalyst or as a scavenger in case where a by-product HF is generated in the above-mentioned reactions, there can be used a basic catalyst. In this case, it is preferable that the basic catalyst is used in an amount of 0.001 to 10 equivalents, preferably 0.01 to 5 equivalents, more preferably 0.1 to 2 equivalents with respect to any of the compounds used as the starting compounds. Examples of the basic catalyst are inorganic bases such as KOH, NaOH, K$_2$CO$_2$ and Na$_2$CO$_3$, organic bases such as triethylamine and tributylamine and the like.

It is preferable that the reaction temperature of the above-mentioned reactions is from −10° to 200° C., preferably from 0° to 150° C., particularly preferably from 10° to 100°

C. In this case, the reactions can be carried out under the reaction pressure of 0 to 50 kg/cm$^2$G, preferably 0 to 20 kg/cm$^2$G, particularly preferably 0 to 10 kg/cm$^3$G. It is preferable that the reaction time is from 30 minutes to 100 hours, preferably from 2 to 50 hours.

It is preferable that the mixing ratio of each starting compound in the above-mentioned reactions, namely, [XVII]/[XVI] equivalent ratio and [XIX]/[XVIII] equivalent ratio are from 0.01 to 20, preferably from 0.5 to 10, more preferably from 0.5 to 3.

In case where the compound [VI], of which substituent corresponding to $R^{40}$ is hydrogen atom, is intended to be obtained only by the first reaction and in case where the compound [VI], of which substituents corresponding to $R^{40}$ and $R^{41}$ are different in the structure from each other, is intended to be obtained by the first and second reactions, it is preferable that the [XVII]/[XVI] equivalent ratio is from 0.5 to 1. Also, in case where the compound [VI], of which substituents corresponding to $R^{40}$ and $R^{41}$ are the same in their structure, is intended to be obtained, it is preferable that the [XVII]/[XVI] equivalent ratio is from 1 to 3 and the reaction is completely finished only by the first reaction.

It is possible to carry out either of the reactions by charging each compound to be used as the starting materials, batchwise or by adding dropwise or blowing one compound into another compound. The present invention is not limited thereto.

There is no specific treating method after the reaction, that is, as a method to recover the compound [VI] from the reaction solution. Purification can be done by a usual method. For instance, the compound [VI] can be recovered by quenching the reaction solution in a large amount of water, extracting with a solvent incompatible with water (S-3, dichloromethane, chloroform and the like), washing with an acid, alkali, saturated saltwater and the like, drying with anhydrous sodium sulfate, anhydrous magnesium sulfate or the like, and then after the filtration, distilling off the solvent from the filtrate under a reduced pressure. If necessary, it is possible to purify further by distilling under a reduced pressure, by a column chlomatography or the like. Compound represented by Formula [VII] In the formula [VII], m is an integer of 2 to 5, n and n' are an integer of 1 to 30, and $1 \leq n+n'' \leq 30$.

$R^{46}$ and $R^{47}$ in the formula [VII] are hydrogen atom, a partly or completely fluorinated linear or branched alkyl, alkenyl or alkoxyalkyl group having 1 to 50, preferably 1 to 35, more preferably 2 to 26 carbon atoms (which may be partly substituted by a halogen atom other than fluorine atom or may have 1 to 3 OH groups in its structure), or a partly or completely fluorinated fluoropolyether group having 2 to 700, preferably 3 to 300, more preferably 5 to 150 carbon atoms (which may be partly substituted by a halogen atom other than fluorine atom, may have 1 to 3 unsaturated bonds in its structure or may have ether bond at its side chain).

Wherein, "being partly or completely fluorinated" means a substituent obtained by substituting a part or a whole of hydrogen atoms of an alkyl group, alkenyl group or alkoxyalkyl group by fluorine atom, or a fluoropolyether group having at least one fluorine atom in its molecule, and "may be partly substituted by a halogen atom other than fluorine atom" and "may have 1 to 3 unsaturated bonds in the structure" mean that there are encompassed a substituent obtained by substituting a part or a whole of hydrogen atoms remaining in a partly fluorinated alkyl group, alkenyl group or alkoxyalkyl group by a halogen atom other than fluorine atom or by substituting 1 to 3 hydrogen atoms by hydroxyl groups, and also a fluoropolyether group having a halogen atom other than fluorine atom in its structure.

As the substituents corresponding to $R^{46}$ and $R^{47}$, there are, for example, a linear or branched fluoroalkyl group or hydroxyfluoroalkyl group having a saturated structure, a linear or branched fluoroalkenyl group or hydroxyfluoroalkenyl group having an unsaturated structure and the like.

Among the compounds [VII], ones having, as substituents corresponding to $R^{46}$ and $R^{47}$, a fluoroalkyl group, fluoroalkenyl group, fluoroalkoxyalkyl group or fluoropolyether group which has a ratio of the number of fluorine atoms/the number of carbon atoms of not less than 0.6, preferably not less than 1, particularly preferably not less than 1.5, are suitable, particularly as a freezer oil and a lubricant for magnetic recording media and are useful as a paint modifying agent because they are soluble in an organic liquid for general uses.

Examples of substituents corresponding to $R^{46}$ and $R^{47}$ are shown hereinbelow. These are preferable from a point that the starting materials thereof for industrial production are easy to obtain, but the present invention is not limited thereto.

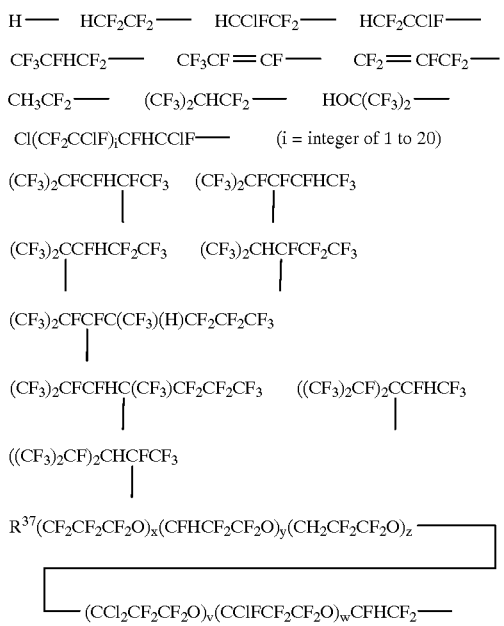

provided that x, y, z, v and w are an integer of 0 to 100, and all of them are not 0 at the same time, $R^{37}$ is a halogen atom or an alkoxyl group having 1 to 3 carbon atoms (which may be partly or completely fluorinated).

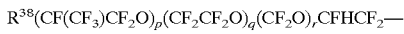

provided that p, q and r are an integer of 0 to 100, and all of them are not 0 at the same time, $R^{38}$ is a halogen atom or an alkoxyl group having 1 to 3 carbon atoms (which may be partly or completely fluorinated).

A fluoropolyether group corresponding to $R^{46}$ and $R^{47}$ can be formed by using a fluoropolyether as a starting material (precursor) which has, at its trunk chain structure, a corresponding perfluoropolyether, a fluoropolyether not having been fluorinated completely or a halogenated fluoropolyether partly substituted by a halogen atom other than fluorine atom. Examples (manufacturer and trade name) of fluoropolyether used as the starting materials are shown hereinbelow. These are ones commercially available, and are preferable from a point that they are easy to obtain, but the present invention is not limited thereto.

Demnum available from Daikin Industries, Ltd.
Krytox available from Du Pont
Fombline Y available from Montefluos
Fombline Z available from Montefluos
Fombline K available from Montefluos
Barierta available from NKL Klueber $R^{49}$ and $R^{48}$ are defined to be the same as $R^{46}$ and $R$ 47 from which hydrogen is excepted.

Preparation Method of Compound [VII]

The compound [VII] can be synthesized through various methods. For example, as a typical synthesizing method of the compound [VII], there is a four step reaction method as shown by the following reaction scheme [G].

Reaction scheme [G]

First reaction:
$HO(C_mH_{2m-1}O)_{n+n'}H + R^{49'} \longrightarrow$
(XX)    (XXI)

$HO(C_mH_{2m-1}O)_{n+n'}R^{49}$ (+ HF)
  |
  OH
  (XXII)

Second reaction:
$HO(C_mH_{2m-1}O)_{n+n'}R^{49'} + n'R^{48'} \longrightarrow$
  |
  OH
  (XXII)    (XXIII)

$HO(C_mH_{2m-1}O)_n(C_mH_{2m-1}O)_{n'}R^{49}$ (+ n'HF)
  |                    |
  OH                  $OR^{48}$
  (XXIV)

Third reaction:
$HO(C_mH_{2m-1}O)_n(C_mH_{2m-1}O)_{n'}R^{49} + nR^{47'} \longrightarrow$
  |                    |
  OH                  $OR^{48}$
  (XXIV)    (XXV)

$HO(C_mH_{2m-1}O)_n(C_mH_{2m-1}O)_{n'}R^{49}$ (+ nHF)
  |                    |
  $OR^{47}$           $OR^{48}$
  (XXVI)

Fourth reaction:
$HO(C_mH_{2m-1}O)_n(C_mH_{2m-1}O)_{n'}R^{49} + nR^{46'} \longrightarrow$
  |                    |
  $OR^{47}$           $OR^{48}$
  (XXVI)    (XXVII)

$R^{46}O(C_mH_{2m-1}O)_n(C_mH_{2m-1}O)_{n'}R^{49}$ (+ HF)
  |                    |
  $OR^{47}$           $OR^{48}$
  (VII)

In the above scheme [G], m is an integer of 2 to 5, n and n' are an integer of 1 to 30, and $1 \leq n+n' \leq 30$. $R^{46}$, $R^{47}$, $R^{48}$ and $R^{49}$ are as defined above.

As the starting compounds [XXVII], [XXV], [XXIII] and [XXI] corresponding to $R^{46'}$, $R^{47'}$, $R^{48'}$ and $R^{49'}$, there are fluoroolefins and fluoroketones mentioned below.

$CF_2=CF_2$   $CClF=CF_2$   $CF_3CF=CF_2$   $CH_2=CF_2$ $(CH_3)_2C=CF_2$   $(CF_3)_2=O$ $Cl(CF_2CClF)_iCF=CClF$   (i = integer of 1 to 20)

$CF_3CF=CF_2$   $(CF_3)_2CFCF=CFCF_3$   $(CF_3)_2C=CFCF_2CF_3$

-continued $(CF_3)_2CFCF=C(CF_3)CF_2CF_2CF_3$   $((CF_3)_2CF)_2C=CFCF_3$ $(CF_3)_2C=C(CF_2CF_3)CF(CF_3)_2$ $R^{37}(CF_2CF_2CF_2O)_x(CFHCF_2CF_2O)_y(CH_2CF_2CF_2O)_z$—

—$(CCl_2CF_2CF_2O)_v(CClFCF_2CF_2O)_wCF=CF_2$ provided that x, y, z, v and w are an integer of 0 to 100, and all of them are not 0 at the same time, $R^{37}$ is a halogen atom or an alkoxyl group having 1 to 3 carbon atoms (which may be partly or completely fluorinated).

$R^{38}(CF(CF_3)CF_2O)_p(CF_2CF_2O)_q(CF_2O)_rCF=CF_2$ provided that p, q and r are an integer of 0 to 100, and all of them are not 0 at the same time, $R^{38}$ is a halogen atom or an alkoxyl group having 1 to 3 carbon atoms (which may be partly or completely fluorinated).

As the starting compound [XX], there are various ones, depending on the value m, and, for instance, there is a compound generally called polyglycerin, and examples thereof are as mentioned below:

$HO(CH_2CHCH_2O)_{n+n'}H$
              |
              OH

As the starting compounds [XI], [XXIII], [XXV] and [XXVII], there are a plurality of compounds as mentioned above. Typical examples thereof are as shown below. These fluoroolefins and fluoroketones are preferable because they are easy to obtain, but the compounds of the present invention are not limited thereto.

| | |
|---|---|
| $CF_2=CF_2$ | [Tetrafluoroethylene] |
| $CClF=CF_2$ | [Chlorotrifluoroethylene] |
| $CF_3CF=CF_2$ | [Hexafluoropropene] |
| $CH_2=CF_2$ | [Vinylidene fluoride] |
| $(CF_3)_2C=CF_2$ | [Octafluoroisobutene] |
| $(CF_3)_2C=O$ | [Hexafluoroacetone] |
| $Cl(CF_2CClF)_{1-20}CF=CClF$ | |
| $(CF_3)_2CFCF=CFCF_3$ | [Dimer of hexafluoropropene, D-1] |
| $(CF_3)_2C=CFCF_2CF_3$ | [Dimer of hexafluoropropene, D-2] |
| $(CF_3)_2CFCF=C(CF_3)CF_2CF_2CF_3$ | |
| | [Trimer of hexafluoropropene, T-1] |
| $((CF_3)_2CF)_2C=CFCF_3$ | [Trimer of hexafluoropropene, T-2] |
| $C_3F_7OCF=CF_2$ | |
| $C_3F_7OCF(CF_3)CF_2OCF=CF_2$ | |
| $C_3F_7O(CF(CF_3)CF_2O)_2CF=CF_2$ | |

The compounds [XXIV] and [XXVI] which correspond to compounds of the formula [VII] in which $R^{46}$, $R^{47}$ and $R^{48}$ are hydrogen atoms can be obtained by, after the first reaction, reducing a mixing ratio of each compound in the second and third reactions, that is, a [XXIII]/[XXII] equivalent ratio or [XXIV]/[XXV] equivalent ratio, or by shortening the reaction time and terminating the reaction prior to completely finishing the reaction.

Also, the compounds, of which substituents corresponding to $R^{46}$, $R^{47}$ and $R^{48}$ are different in the structure from one other, can be obtained by using different fluoroolefins as the compounds [XXI], [XXIII], [XXV] and [XXVII] used as the starting materials in the respective reactions.

The compound, of which substituents corresponding to $R^{46}$, $R^{47}$, $R^{48}$ and $R^{49}$ are the same in the structure, can be obtained by completely reacting the hydroxyl group of the compound [XXI] used as the starting materials by using the same fluoroolefin as the compounds [XXI], [XXIII], [XXV] and [XXVII] without discriminating each step of reactions.

It is practically difficult to carry out each reaction by completely discriminating it from each other, and also there is no problem even if the product is a mixture of various compounds. However, if the obtained compounds are used as a freezer oil, one having a high volume resistance and low water absorption property is preferable. For instance, compounds having a hyroxyl group value of not more than 80, preferably not more than 50, more preferably not more than 30 are preferable.

The first, second, third and fourth reactions can be carried out fundamentally under the same conditions. These reactions can be conducted in a solvent or without using a solvent. In case of using the solvent, it is preferable that an amount thereof in volume is 0.1 to 100 times, preferably 0.5 to 10 times, more preferably 1 to 5 times the total amount of the compounds used as the starting materials. As the usable solvents, there are, for example, aprotic polar solvent. Examples thereof are methyl ethyl ketone, acetone, DMF, DMSO, NMP, sulforan, diglyme, triglyme, ether, THF, chloroform, dichloromethane and the like.

In the above-mentioned reactions, as a catalyst or as a scavenger in case where a by-product HF is generated in the above-mentioned reactions, there can be used a basic catalyst. In this case, it is preferable that the basic catalyst is used in an amount of 0.001 to 10 equivalents, preferably 0.01 to 5 equivalents, more preferably 0.1 to 2 equivalents with respect to any of the compounds used as the starting materials. Examples of the basic catalyst are inorganic bases such as KOH, NaOH, $K_2CO_3$ and $Na_2CO_3$, organic bases such as triethylamine and tributylamine and the like.

It is preferable that the reaction temperature of the above-mentioned reactions is from $-10°$ to $200°$ C., preferably from $0°$ to $150°$ C., particularly preferably from $10°$ to $100°$ C. In this case, the reactions can be carried out under the reaction pressure of 0 to 50 kg/cm$^2$G, preferably 0 to 20 kg/cm$^2$G, particularly preferably 0 to 10 kg/cm$^2$G. It is preferable that the reaction time is from 30 minutes to 100 hours, preferably from 2 to 50 hours.

It is preferable that the mixing ratio of each compound used as the starting materials in the above-mentioned reactions, namely, [XXI]/[XX] equivalent ratio, [XXIII]/[XXII] equivalent ratio, [XXV]/[XXIV] equivalent ratio and [XVII]/[XXVI] equivalent ratio are usually from 0.01 to 20, preferably from 0.5 to 10, more preferably from 0.5 to 3.

In case where the compound [VI], of which $R^{46}$, $R^{47}$ and $R^{48}$ correspond to hydrogen atom, is intended to be obtained and in case where the compound, of which substituents corresponding to $R^{46}$, $R^{47}$, $R^{48}$ and $R^{49}$ are different in the structure from each other, is intended to be obtained by carrying out the first, second, third and fourth reactions, it is preferable that the [XXI]/[XX] equivalent ratio, [XXIII]I/[XXII] equivalent ratio and [XXV]/[XXIV] equivalent ratio are from 0.5 to 1, respectively. Also, in case where the compound [VI], of which substituents corresponding to $R^{46}$, $R^{47}$, $R^{48}$ and $R^{49}$ are the same, is intended to be obtained, it is preferable that the [XXI]/[XX]equivalent ratio, [XXIII]/[XXII] equivalent ratio and [XXV]/[XXIV] equivalent ratio are from 1 to 3, respectively and the reaction is completely finished only by the first reaction.

It is possible to carry out any of the reactions by charging each compound used as the starting materials, batchwise or by adding dropwise or blowing one compound into another compound. The present invention is not limited thereto.

There is no specific treating method after the reactions, that is, as a method to recover the compound [V] from the reaction solution. Purification can be done by a usual method. For instance, the compound [V] can be recovered by quenching the reaction solution in a large amount of water, extracting with a solvent incompatible with water (S-3, dichloromethane, chloroform and the like), washing with an acid, alkali, saturated saltwater and the like, drying with anhydrous sodium sulfate, anhydrous magnesium sulfate and the like, and then after the filtration, distilling off the solvent from the filtrate under a reduced pressure. If necessary, it is possible to purify further by distilling under a reduced pressure, by a column chromatography or the like.

Compound represented by Formula [VIII] and Preparation Method thereof $R^{46}$, $R^{47}$, $R^{48}$ and $R^{49}$ in the formula [VIII] are defined similarly to those in the above-mentioned formula [VII]. That is, the compound [VIII] is the same as the compound [VII] except that the skeleton of the recurring units constructing a trunk chain is polyglycerin structure represented by

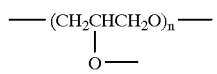

The compound [VIII] can be prepared in the same manner as in the compound [VII] except that polyglycerin having the recurring unit represented by

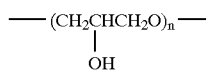

is used as the starting material for constructing the trunk chain.

Among these compounds [IV] to [VIII], the compounds [V], [VI] and [VII] are preferable from the viewpoint of their thermal stability and solubility to a solvent and from economical point of view such as easiness in obtaining them, and further those having a reactive group such as OH group at its side chain or end group are particularly preferable from a point that excellent water- and oil-repelling property and stain resistance are exhibited and maintained.

(3) The polymer having a perfluoroalkyl group is, for example, one mainly comprising a polymer of an ethylenically unsaturated monomer having a perfluoroalkyl group or a copolymer comprising the above-mentioned monomer and a monomer copolymerizable therewith. The unsaturated ethylenic monomer having a perfluoroalkyl group is the monomer represented by the following formulae.

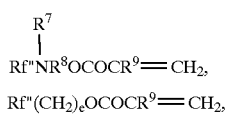

-continued

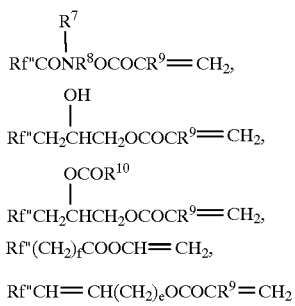

wherein Rf" is a perfluoroalkyl group having 4 to 20 carbon atoms, $R^7$ is hydrogen or an alkyl group having 1 to 10 carbon atoms, $R^8$ is an alkylene group having 1 to 10 carbon atoms, $R^9$ is hydrogen atom or methyl, $R^{10}$ is an alkyl group having 1 to 17 carbon atoms, e is an integer of 1 to 10, f is an integer of 0 to 10.

Examples of the monomers copolymerizable with the above-mentioned monomers are, for instance, alkyl (meth) acrylate (alkyl group having 1 to 20 carbon atoms), cyclohexyl (meth)acrylate or benzyl (meth)acrylate, polyethylene glycol di(meth)acrylate, N-methylol-acrylamide, ethylene, vinyl chloride, vinyl fluoride, (meth)acrylic amide, styrene, α-methylstyrene, p-methylstyrene, vinyl alkyl ether (alkyl group having 1 to 20 carbon atoms), halogenated alkyl vinyl ether (alkyl group having 1 to 20 carbon atoms), vinyl alkyl ketone (alkyl group having 1 to 20 carbon atoms), maleic acid anhydride, butadiene, isoprene, chloroprene and the like, but the monomers are not limited thereto.

There are commercially available ones wherein the copolymer comprising the above-mentioned monomers is dissolved or dispersed in a solvent comprising organic liquid and/or water. For example, there are Texguard (trade name) TG652 and TG664 from Daikin Industries, Ltd. and the like.

(4) Fluorosilicone oil is a polysiloxane having a fluoroalkyl group at its side chain or end, and therefore is shown by the following formula. However, the fluorosilicone oil is not limited thereto.

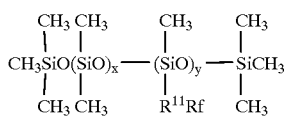

wherein, $R^{11}$ is an alkylene group having one or more carbon atoms, Rf is the same as above, x is an integer of 0 or more, y is an integer of 1 or more.

There are commercially available ones such as FS-1265 from Toray Dow Corning Silicone Co., Ltd. and X-22-819 and FL100 from Shin-Etsu Chemical Co., Ltd.

As the silicone oil which is another leveling agent, in order to exhibit water- and oil-repelling property, ones having a viscosity of not less than 50 centipoises at 25° C. or having a reactive group at its side chain or end are preferable. For example, there are dimethyl silicone oil, methyl chloride silicone oil, methyl phenyl silicone oil, organo-modified silicone oil and the like, and the organo-modified silicone oil is preferable. For example, there are ones shown by the following formulae:

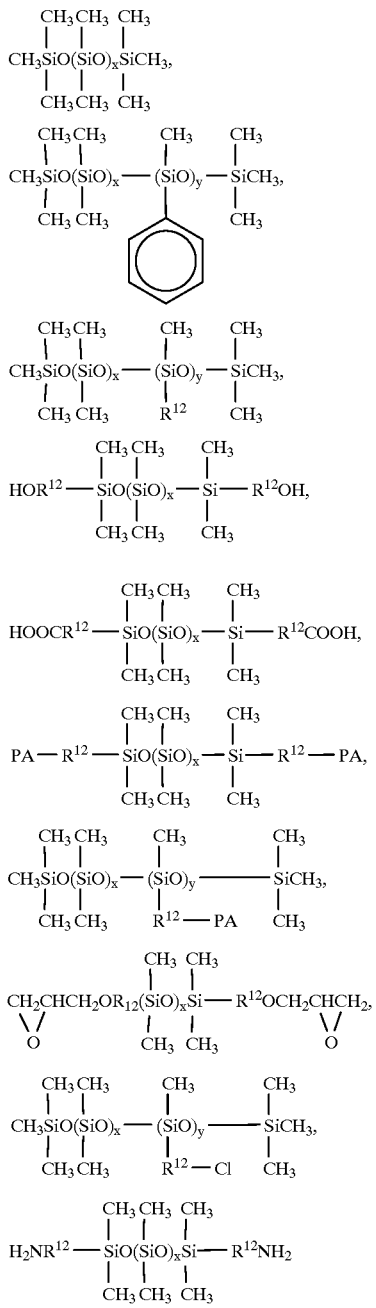

wherein, $R^{12}$ is an alkylene group having 1 or more carbon atoms, PA is a polyalkyleneoxide, each of x and y is an integer of 1 or more.)

For example, there are PRX413, SF8417, SF8418, BY16-855B, SF8427 and SF8428 from Toray Dow Corning Silicone Co., Ltd., X-22-161C, X-22-163C, X-22-162A, KF-6001 and KF-857 from Shin-Etsu Chemical Co., Ltd.

Adding amounts of them are as mentioned below per 100 parts of the film forming component.

(a) Polyfluorinated carbon chain-containing compound 0.01 to 3.0 parts (b) Silicone oil 0.01 to 3.0 parts When both (a) and (b) are lower than 0.01 part, the water- and oil-repelling property and stain resistance become insufficient. When more than 3.0 parts, cissing and flowing are easy to occur and smooth coating is difficult to obtain. Also, addition of a leveling agent can prevent the cissing and if a large amount of (a) and (b) are contained, hardness of the coating lowers, thereby making the stain resistance worse. The amounts of (a) and (b) are each preferably from 0.05 to 2 parts, more preferably from 0.10 to 1 part from the points that a smooth coating and excellent stain resistance are obtained. By adding both (a) and (b), the coating exhibits excellent water- and oil-repelling property and stain resistance. The reason is not evident, but is assumed to be synergetic effect of the fluoroalkyl group and the silicone oil.

It is preferable that the leveling agent is added to the paint composition of the present invention to ensure the leveling property and prevent the cissing. As the leveling agent, there are an acryl oligomer type, polysiloxane type and the like. The polysiloxane type is preferably used. As the polysiloxane type leveling agent, there are polysiloxanes having a viscosity lower than 50 centipoises or ones having no reactive group, for example, polysiloxane polyether copolymer, alkyl-modified polysiloxane, dimethyl polysiloxane, methylphenyl polysiloxane and the like. In general there are often used polysiloxanes well compatible with the film forming resin and having a viscosity of 5 to 50 centipoises at 25° C. As the commercially available polysiloxanes, there are DC11PA and ST80PA from Toray Dow Corning Silicone Co., Ltd., KP-321 and KP-324 from Shin-Etsu Chemical Co., Ltd. and the like. An adding amount of them is from 0.001 to 5.0 parts. When the adding amount is lower than 0.001 part, there is no effect on leveling property and prevention of the cissing, and a smooth coating is difficult to obtain. On the contrary, when more than 5.0 parts, the cissing is easy to occur. It is preferably 0.005 to 1.0 part, more preferably 0.05 to 0.50 part from a point that it is easy to obtain the smooth coating.

In the present invention, as the film forming components, a film forming resin or a mixture of a film forming resin and a curing agent is used.

As the above-mentioned film forming resin, there are an acrylic resin, acrylic silicone resin, alkyd resin, epoxy resin, polyester resin, polyurethane resin, phenolic resin, urea resin, polyimide resin, polyamide resin, polyamideimide resin, polyether sulphone resin, polyphenylene sulfide resin, solvent soluble fluorine-containing polymer, silicone polyester resin, poly(vinylidene fluoride) resin (including one mixed with an acrylic resin) and the like. These resins are used alone or in combination thereof. The film forming resins preferable from the points of corrosion resistance, solvent resistance, adhesion and the like are epoxy resin, polyimide resin, polyamide resin and polyamideimide resin, or ones preferable from the points of weatherability, solvent resistance, transparency and the like are a poly(vinylidene fluoride) resin (including a mixture with an acrylic resin), an acrylic resin having curable moieties, a polyester resin having curable moieties or a solvent soluble fluorine-containing copolymer having curable moieties, which is mixed with an isocyanate compound or an alkylether type amino resin as a curing agent, a silicone polyester resin and an acrylic silicone resin. From a point of maintaining weatherability, corrosion resistance, stain resistance and water- and oil-repelling property, particularly preferable is the solvent soluble fluorine-containing copolymer having curable moieties, which is mixed with an isocyanate compound or an alkylether type amino resin as a curing agent. Also, an acrylic resin compatible with a solvent soluble fluorine-containing copolymer can be blended if necessary.

The solvent soluble fluorine-containing copolymer having curable moieties is a fluorine-containing copolymer comprising a fluoroolefin unit and a vinyl monomer unit having curable moieties. As the fluoroolefin, there are, for example, tetrafluoroethylene, chlorotrifluoroethylene, vinylidene fluoride, hexafluoropropylene, vinyl fluoride, trifluoroethylene and the like. As the vinyl monomer having curable moieties, there are, for example, monomers having hydroxyl, epoxy, silyl, carboxyl or amino group and the like as the curable moieties.

As the monomers having hydroxyl group, there are hydroxyalkyl vinyl ether and hydroxyalkyl allyl ether represented by, for instance, the formula (I):

wherein $R^{13}$ is $—OR^{14}$ or $—CH_2OR^{14}$ ($R^{14}$ is an alkyl group having hydroxyl group. $R^{14}$ is, for instance, one wherein a linear or branched alkyl group having 1 to 8 carbon atoms is bonded with 1 to 3, preferably one hydroxyl group. Examples thereof are, for instance, 2-hydroxyethyl vinyl ether, 3-hydroxypropyl vinyl ether, 2-hydroxypropyl vinyl ether, 2-hydroxy-2-methylpropyl vinyl ether, 4-hyroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, glycerol monoallyl ether and the like. As the monomers other than the above, there are, for instance, epoxy group-containing vinyl monomers described in JP-A-232250/1990 and JP-A-232251/1990 or silyl-containing monomers described in JP-A-141713/1986 and the like.

As the epoxy group-containing vinyl monomers, there are epoxy vinyl or epoxy vinyl ether represented by the formula (II):

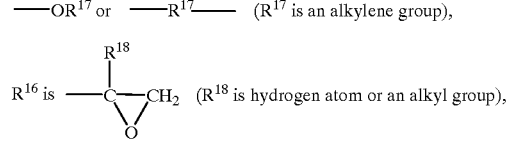

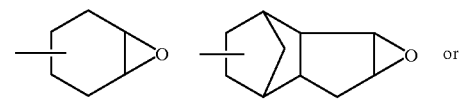

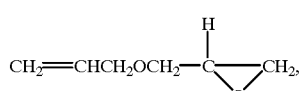

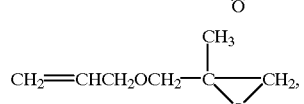

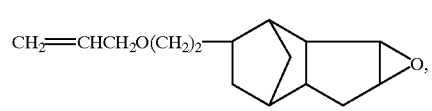

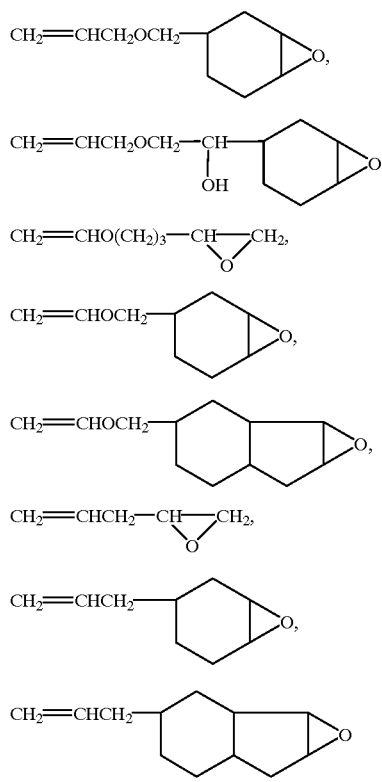

and the like.

As the examples of the silyl group-containing vinyl monomers, there are vinyltrimethoxysilane, vinyltriethoxysilane, vinyltripropoxysilane, vinylmethyldimethoxysilane, vinyldimethylmethoxysilane, vinylmethyldiethoxysilane, vinyltris(β-methoxyethoxy)silane, trimethoxysilylethyl vinyl ether, trimethoxysilylethyl vinyl ether, methyldimethoxysilylethyl vinyl ether, trimethoxysilylpropyl vinyl ether, triethoxysilylpropyl vinyl ether, vinyltriisopropenyloxysilane, vinylmethyldiisopropenyloxysilane, triisopropenyloxysilylethyl vinyl ether, triisopropenyloxysilylpropyl vinyl ether, triisopropenyloxysilylbutyl vinyl ether, vinyl-tris(dimethyliminooxy)silane, vinyl-tris(methylethyliminooxy)silane vinylmethyl-bis(dimethyliminooxy)silane, vinyldimethyl(dimethyliminooxy)silane, tris(dimethyliminooxy)silylethyl vinyl ether, methylbis(dimethyliminooxy)silylethyl vinyl ether, tris(dimethyliminooxy)silylbutyl vinyl ether, γ-(meth)acryloyloxypropyltrimethoxysilane, γ-(meth)acryloyloxypropyltriethoxysilane, γ-(meth)acryloyloxypropylmethyldimethoxysilane, γ-(meth)acryloyloxypropyltriisopropenyloxysilane, γ-(meth)acryloyloxypropyltris(β-methoxyethoxy)silane, γ-(meth)acryloyloxypropyl-tris(dimethyliminooxy)silane, allyltrimethoxysilane and the like.

As the carboxyl group-containing monomers, there are carboxyl group-containing vinyl monomers represented by the formula (IIIa):

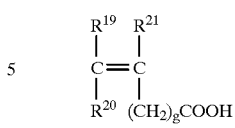

(IIIa)

wherein, $R^{19}$, $R^{20}$ and $R^{21}$ are the same or different, each is hydrogen atom, an alkyl group, phenyl, carboxyl or an ester group, g is 0 or 1 or the formula (IIIb):

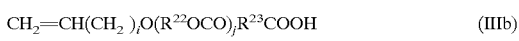

wherein, $R^{22}$ and $R^{23}$ are the same or different, each is a saturated or unsaturated linear or cyclic alkyl group, i is 0 or 1, j is 0 or 1. Examples thereof are, for instance, acrylic acid, methacrylic acid, vinyl acetate, crotonic acid, cinnamic acid, 3-allyloxypropionic acid, itaconic acid, itaconic acid monoester, maleic acid, maleic acid monoester, maleic anhydride, fumaric acid, fumaric acid monoester, phthalic acid monovinyl ester, pyromellitic acid monovinyl ester and the like.

Also one or more other copolymerizable monomers can be copolymerized. As the copolymerizable monomers, there are vinyl esters, vinyl ethers, esters of acrylic acid or methacrylic acid, olefins and the like, but the copolymerizable monomers are not limited thereto.

As the isocyanate compounds, there are polyisocyanate compounds and blocked polyisocyanate comopunds. As the polyisocyanate compounds, there are, for example, 2,4-tolylenediisocyanate, xylylenediisocyanate, diphenylmethane-4,4'-diisocyanate, lysinemethylesterdiisocyanate, methylcyclohexyldiisocyanate, ethylenediisocyanate, propylenediisocyanate, trimethylhexamethylenediisocyanate, n-pentane-1,4-diisocyanate, tetramethylenediisocyanate, hexamethylenediisocyanate, phenylenediisocyanate, isophoronediisocyanate, a trimer thereof, an adduct and burette thereof, a polymer thereof having two or more isocyanate groups and the like. Also as the blocked polyisocyanate compound, there are polyisocyanate compounds as mentioned above which have been blocked using a blocking agent. As the blocking agents, there are, for example, a phenol-type, an alcohol-type, a mercaptan-type, an oxime-type, a lactum-type or an imine-type compound and the like, but the blocking agents are not limited thereto. For accelerating the curing, there can be used various catalysts, for example, organic metal compounds such as dibutyltindilaurate and tertiary amines, if necessary.

As the alkyl-etherified amino resin, there are, for example, melamine resins, urea resins and benzoguanamine resins subjected to alkyl etherification such as methyl etherification, butyl etherification, isobutyl etherification and methyl butyl mixture etherification and the like. For accelerating the curing, there can be added an acid catalyst (for example, organic sulfonic acid catalyst such as paratoluene sulfonic acid), if necessary.

The proportion of the curing agent is from 0.1 to 5 equivalents, preferably from 0.3 to 2 equivalents, more preferably from 0.5 to 1.5 equivalents per 1 equivalent of curable moieties in the above-mentioned acrylic resin having curable moieties, a polyester resin and polyether resin having curable moieties and the solvent soluble fluorine-containing copolymer having curable moieties. As the solvent soluble fluorine-containing copolymer having curable moieties, an acrylate copolymer containing a perfluoroalkyl group can be used, but is inferior as compared with the above-mentioned fluorine-containing copolymer having a fluoroolefin unit from a point of weatherability and from economical point of view, and thus is not desirable.

In case where the film forming resin dissolves in an organic liquid, the liquid is preferably an organic solvent. There can be used solvents, which can be usually used for paints, for example, hydrocarbons e.g. aromatic hydrocarbons such as xylene and toluene, esters such as butyl acetate, ketones such as methyl isobutyl ketone, glycol ethers such as ethyl cellosolve and a mixed petroleum solvent represented by mineral spirit and Solvesso (available from Exxon Chemical Japan Ltd.) and the like. Also in case where the film forming resin is dissolved or dispersed in water, water soluble acetone and alcohols can be added in the medium.

Further in case where non-tackifying property is required, there can be added solvent insoluble fluorine-containing resins such as polytetrafluoroethylene (PTFE), ethylene-tetrafluoroethylene copolymer (ETFE), ethylene-chlorotrifluoroethylene copolymer (ECTFE), tetrafluoroethylene-hexafluoropropene copolymer (FEP), tetrafluoroethylene-perfluoroalkylvinylether copolymer (PFA) and the like.

In addition, there may be properly added pigment, filler, pigment dispersing agent, flatting agent, viscosity controlling agent, gelation inhibitor, ultraviolet ray absorbing agent, photo-stabilizing agent, moisture absorbing agent, defoaming agent, thickener, plasticizer, antisag agent, precipitate preventing agent, antiflooding agent, antiskinning agent, scratch preventing agent, antifungal agent, antibacterial agent, antioxidant, antistatic agent, silane coupling agent and the like.

As coating methods, the known methods can be adopted. In coating, there can be used the known coating equipments such as brush, roller, roll coater, air spray, airless spray, electrostatic coating machine, dip coating machine and electrodeposition coating machine.

The paint composition of the present invention is prepared, in accordance with the well known method, by mixing and dispersing the film forming resin, the pigment and the solvent and admixing the curing agent, the silicone oil, the polyfluorinated carbon chain-containing compound and other additives and then stirred.

The paint composition of the present invention can be applied to various substrates, not only metals such as iron, aluminium, copper or alloys thereof, but also inorganic materials such as glass, cement and concrete, resins such as FRP, acrylic resin, vinyl chloride resin, polycarbonate and polyurethane, woods, fibers and the like. Also, the substrates may be subjected to preliminary treatment and surface treatment if necessary. The composition of the present invention can be coated after the undercoating and pre-coating properly. After coating, the coatings are cured by drying normally at 5° to 300° C. for 30 seconds to one week, depending on a kind of the curing agent. The coating thickness is not particularly limited, and is normally from 1 to 200 μm, preferably from 5 to 100 μm, more perferably from about 10 to about 50 μm.

The thus obtained coated articles can be applied to various uses because of their excellent water- and oil-repelling property, stain resistance and also lubricity on the surface of the coating. That is, they are widely applicable to the coating for electric machines (electronic oven, toaster, refrigerator, washing machine, hair dryer, television set, video recorder, amplifier, radio, electric kettle, rice cooker, radio with a cassette recorder, cassette deck, compact disc player, video camera, air conditioner proper inside the room and compressor outside the room, blowing air louver and duct therefor, air cleaner, fluorescent lamp, reflection plate and the like), furnitures, machine parts, decorations, comb, frame for glasses, natural fibers, synthetic fibers, office appratuses (telephone set, facsimile machine, copying machine (including rolls), camera, overhead projector, epidiascope, clock, slide projector, desk, bookstand, locker, filing cabinet, chair, bookends, electronic white board, scissors, cutting knife and the like), automobiles (wheel, door mirror, braid, door knob, number plate, steering wheel, instrumental panal and the like), or cooking instruments (oven hood, sink, dresser, kitchen-knife, chopping board, water plug, gas oven, ventilation fan and the like), for indoor coating such as partition wall, bath unit, shutter, window shade, curtain rail, accordion curtain, wall, ceiling and floor, for outdoor coating for housing and building such as outside wall, handrail, door and shutter, coating for building such as sizing material for ceramic industry, foamed concrete panel, concrete panel, curtain wall and vinyl chloride-covered steel plate and sheet, window glass and others.

Subsequently, the present invention is explained by means of Examples and Comparative Examples, but are not particularly limited thereto.

EXAMPLES 1 TO 10 AND COMPARATIVE EXAMPLES 1 TO 12

A film forming resin (hereinafter may be referred to as "main component"), a pigment (R-960) and butyl acetate were fully dispersed by a sand mill according to the composition shown in Tables 1, 2 and 3 (unit is "part by weight", the compositions other than a fluorine-containing water- and oil-repelling agent and leveling agent are calculated as solid contents) and further stirred sufficiently with adding a curing agent and other additives to give a paint composition.

In the tables, among the resins used as the main component, (a) Acrydic A-80 1 is an acrylic resin (hydroxyl group-containing acrylic resin) from Dainippon Ink & Chemicals Inc., (b) Zeffle GK-510 is a water soluble fluorine-containing copolymer (hydroxyl group-containing and fluorine-containing copolymer) from Daikin Industries, Ltd., (j) Almatex P-646 is a polyester resin from Mitsui Toatsu Chemicals Inc. and (m) Beckolite 52-584 is a silicone polyester resin from Dainippon Ink & Chemicals Inc. As the curing agent, (c) Coronate 2507 is hexamethylenediisocyanate type blocked compound from Nippon Polyurethane Industry Co., Ltd. and (d) Cymel 303 is a melamine resin (completely alkyl type methylated melamine) from Mitsui Cyanamid Ltd., and as the polyfluorinated carbon chain-containing compound, (e) FS1265 is a fluorosilicone oil

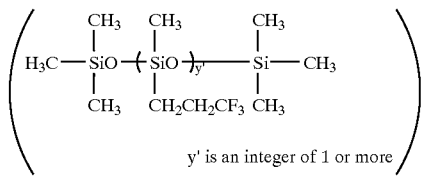

from Toray Dow Corning Silicone Co., Ltd., (f) TG664 is a fluorine-containing water- and oil-repelling agent "Texguard (Trade mark)" (solid content 16% by weight) (solution comprising a fluorine-containing acrylate copolymer) from Daikin Industries, Ltd., (k) Daifloil #20 is a fluorine-containing oil (polymer of chlorotrifluoroethylene, number average molecular weight 1,000) from Daikin Industries, Ltd., (l) Unidyne DS-406 is a nonionic fluorine-containing surfactant from Daikin Industries, Ltd., and (g) KF6001 used as the silicone oil is an organic modified silicone oil

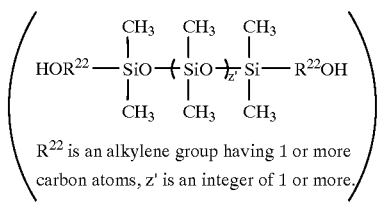

(R$^{22}$ is an alkylene group having 1 or more carbon atoms, z' is an integer of 1 or more.)

from Shin-Etsu Chemical Co., Ltd. and (h) KP-324 used as the leveling agent is a silicone type leveling agent (10% toluene solution) from Shin-Etsu Chemical Co., Ltd. (i) R-960 used as the other component is a rutile type titanium oxide from Du Pont.

The obtained paint composition was coated on a galvanized steel sheet by a bar coater, followed by baking at 200° C. for 2 minutes to form a 20 μm thick coating. Thus a coated article was obtained.

In Comparative Example 6, the coating prepared by curing and drying acryl-type white enamel is spray-coated with a methaxylene-hexafluoride solution (dibutyltindilaurate is contained as the curing accelerator in an amount of 0.1% by weight based on a resin component) comprising 10% by weight of a copolymer of $CH_2=CFCOO(CH_2)_2C_8H_{17}$ (17FFA)/$CH_2=C(CH_3)COOCH_3$(MMA)/$CH_2CFCOO(CH_2)_3Si(OCH_3)_3$ (α FTMSi) (=65/10/25: weight ratio). Afterwards, the obtained coated article was subjected to curing and drying at 150° C. for 30 minutes to give a clear coating.

The paint composition in Comparative Example 7 is one obtained in the manner mentioned below for repeating the example of JP-A-175386/1992. That is, as "A" solution, there was used one prepared by using 20 parts of commercially available modified silicone resin varnish, 10 parts of Polyol (Desmophen 800 (polyester resin) from Nippon Polyurethane Industry Co., Ltd.), 10 parts of Polyol (Desmophen 1100 (polyester resin) from Nippon Polyurethane Industry Co., Ltd.), 10 parts of cellosolve acetate, 10 parts of methyl cellosolve, 10 parts of butyl cellosolve, 10 parts of methyl ethyl ketone, 10 parts of fluorine-containing resin (water- and oil-repelling agent from Asahi Glass Co., Ltd., AG650), 2 parts of silicone oil (SH-200 (dimethylsilicon) from Toray Dow Corning Silicone Co., Ltd.) and 0.5 part of octyl zinc. As "B" solution, there was used one prepared by using 28 parts of isocyanate (Coronate HL from Nippon Polyurethane Industry Co., Ltd.) and 2 parts of toluene. The solutions "A" and "B" were stirred and mixed separately, and just prior to coating, the solutions "A" and "B" were mixed to prepare a paint composition.

The contact angles of the coatings formed in Examples 1 to 10 and Comparative Examples 1 to 5 and 7 to 12 and also the clear coating formed in Comparative Example 6, and stain resistance using red ink were measured by the following method.

(1) Contact angle

Water or n-hexadecane was dripped on a measuring surface to measure the contact angle at 25° C. by a contact-angle meter model CA-DT from Kyowa Kaimen Kagaku Co., Ltd.

(2) Stain resistance using red ink

Cissing just after applying red ink onto the coated surface was observed with naked eyes.

| Criteria for evaluation: | o; No cissing occurs, |
| --- | --- |
| | X; Cissing occurs. |

24 Hours after, red ink was wiped off with ethanol for evaluation with naked eyes.

| Criteria for evaluation: | o; No stain |
| --- | --- |
| | Δ; Slightly stained |
| | X; Stain mark fully remains |

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| (Main component) | | | | | | | | | | |
| Acrydic A-801 (a) | 62 | 62 | | | | | | | | |
| Zeffle GK-510 (b) | | | 80 | 80 | 80 | 80 | 80 | 80 | | |
| Almatex P-646 (j) | | | | | | | | | 75 | |
| Beckolite 52–584 (m) | | | | | | | | | | 75 |
| (Curing agent) | | | | | | | | | | |
| Coronate 2507 (c) | 38 | 38 | | | | | | | | |
| Cymel 303 (d) | | | 20 | 20 | 20 | 20 | 20 | 20 | 25 | 25 |
| (Polyfluorinated carbon chain-containing compound) | | | | | | | | | | |
| FS1265 (e) | 0.05 | | 0.05 | | 1.00 | 2.00 | | | 0.50 | 0.50 |
| TG664 (f) | | 0.31 | | 0.31 | | | | | | |
| Daifloil #20 (k) | | | | | | | 0.05 | | | |
| Unidyne DS-406 (l) | | | | | | | | 0.05 | | |
| (Silicone oil) | | | | | | | | | | |
| KF6001 (Leveling agent) | 0.05 | 0.05 | 0.05 | 0.05 | 1.00 | 2.00 | 0.05 | 0.05 | 0.50 | 0.50 |
| KP-324 (h) | | | 1.50 | 1.50 | 1.50 | 1.50 | 1.50 | 1.50 | | |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| (Others) | | | | | | | | | | |
| Dibutyltindilaurate | 0.015 | 0.015 | | | | | | | | |
| p-toluenesulfonic acid | | | 1.0 | 1.0 | 1.0 | 1.0 | 1.0 | 1.0 | 0.7 | 0.7 |
| R-960 (Titanium white) (i) | 50 | 50 | 50 | 50 | 50 | 50 | 50 | 50 | 40 | 40 |
| Solvent (butyl acetate, etc.) | 150 | 150 | 150 | 150 | 150 | 150 | 150 | 150 | 140 | 93 |
| (Film characteristics) | | | | | | | | | | |
| Contact angle (°) | | | | | | | | | | |
| for water | 105 | 106 | 102 | 104 | 106 | 108 | 104 | 107 | 106 | 105 |
| for n-hexadecane | 33 | 36 | 30 | 29 | 28 | 36 | 22 | 33 | 35 | 34 |
| Stain resistance using red ink | | | | | | | | | | |
| Cissing of red ink | ◯ | ◯ | ◯ | ◯ | ◯ | ◯ | ◯ | ◯ | ◯ | ◯ |
| Stain mark after wiping red ink | ◯ | ◯ | ◯ | ◯ | ◯ | ◯-Δ | ◯-Δ | ◯-Δ | ◯ | ◯ |

TABLE 2

|  | Ex. 1 | Ex. 2 | Ex. 3 | Ex. 4 | Ex. 5 | Ex. 6 | Ex. 7 |
|---|---|---|---|---|---|---|---|
| (Main component) | | | | | | | |
| Acrydic A-801 (a) | 62 | 62 | 62 | 62 | 62 | 62 | |
| Zeffle GK-510 (b) | | | | | | | |
| (Curing agent) | | | | | | | |
| Coronate 2507 (c) | 38 | 38 | 38 | 38 | 38 | 38 | |
| Cymel 303 (d) | | | | | | | |
| (Polyfluorinated carbon chain-containing compound) | | | | | | | Paint was prepared |
| FS1265 (e) | | | | | | | according to the example |
| TG664 (f) | | | 0.31 | | 25.0 | | of JP-A-175386/1992 |
| (Silicone oil) | | | | | | | |
| KF6001 (g) | | | | 0.05 | 4.00 | | |
| (Leveling agent) | | | | | | | |
| KP-324 (h) | | 1.50 | | | | | |
| (Others) | | | | | | | |
| Dibutyltindilaurate | 0.015 | 0.015 | 0.015 | 0.015 | 0.015 | 0.015 | |
| p-toluenesulfonic acid | | | | | | | |
| R-960 (Titanium white) | 50 | 50 | 50 | 50 | 50 | 50 | |
| Solvent (butyl acetate, etc.) | 150 | 150 | 150 | 150 | 150 | 150 | |
| (Film characteristics) | | | | | | | |
| Contact angle (°) | | | | | | | |
| for water | 77 | 97 | 90 | 103 | cissing occurred, smooth film | 110 | cissing occurred, smooth film |
| for n-hexadecane | wet | 18 | 18 | 36 | | 60 | |
| Stain resistance using red ink | | | | | | | |
| Cissing of red ink | X | X | X | ◯ | not obtained | ◯ | not obtained |
| Stain mark after wiping red ink | X | Δ | X | X | | Δ | |

Remarks
Fluorine containing acryl was coated on the dry film of the above-mentioned paint.

TABLE 3

|  | Com. Ex. 8 | Com. Ex. 9 | Com. Ex. 10 | Com. Ex. 11 | Com. Ex. 12 |
|---|---|---|---|---|---|
| (Main component) | | | | | |
| Acrydic A-801 (a) | | | | | |
| Zeffle GK-510 (b) | 80 | 80 | 80 | 80 | |
| Beckolite 52-584 (m) | | | | | 75 |
| (Curing agent) | | | | | |
| Coronate 2507 (c) | | | | | |
| Cymel 303 (d) | 20 | 20 | 20 | 20 | 25 |
| (Polyfluorinated carbon | | | | | |

TABLE 3-continued

|  | Com. Ex. 8 | Com. Ex. 9 | Com. Ex. 10 | Com. Ex. 11 | Com. Ex. 12 |
|---|---|---|---|---|---|
| chain-containing compound) |  |  |  |  |  |
| FS1265 (e) |  |  |  | 5.00 |  |
| TG664 (f) |  | 0.31 |  |  |  |
| (Silicone oil) |  |  |  |  |  |
| KF6001 (g) |  |  | 0.15 | 5.00 |  |
| (Leveling agent) |  |  |  |  |  |
| KP-324 (h) |  |  |  | 1.50 |  |
| (Others) |  |  |  |  |  |
| Dibutyltindilaurate | 1.0 | 1.0 | 1.0 | 1.0 | 0.70 |
| p-toluenesulfonic acid | 50 | 50 | 50 | 50 | 40 |
| R-960 (Titanium white) | 150 | 150 | 150 | 150 | 93 |
| Solvent (butyl acetate, etc.) |  |  |  |  |  |
| (Film characteristics) |  |  |  |  |  |
| Contact angle (°) |  |  |  |  |  |
| for water | 100 | 104 | 120 | 105 | 100 |
| for n-hexadecane | wet | 10 | 36 | 36 | 19 |
| Stain resistance using red ink |  |  |  |  |  |
| Cissing of red ink | X | X | ○ | ○ | ○ |
| Stain mark after wiping red ink | ○ | ○ | Δ | X | Δ |

The surfaces of the coatings prepared in Example 2 and Comparative Example 4 were subjected to electron spectroscopy for chemical analysis (ESCA) by the use of model ESCA-750 from Shimadzu Corporation. The results are shown in Table 4. As is clear from Table 4, in case where both the fluorine-containing water- and oil-repelling agent and silicone oil were added (Example 2), not only many fluorine atoms (F), but also silicon atoms (Si) were detected on the coating surface, as compared with silicone oil alone (Comparative Example 4). It can be considered that excellent water- and oil-repelling property and stain resistance are accomplished by a synergetic effect of those fluoroalkyl group and silicone oil.

TABLE 4

|  | Si | F | N | O | C |
|---|---|---|---|---|---|
| Example 2 | 14.3 | 2.63 | 5.06 | 32.5 | 100 |
| Comparative Example 4 | 11.3 | 1.60 | 4.86 | 28.7 | 100 |

Analyzed value is based on C (carbon atom) (100).

EXAMPLES 11 TO 16 AND COMPARATIVE EXAMPLES 13 TO 22

The main component, a pigment (R-960) and butyl acetate were fully dispersed by a sand mill according to the composition shown in Tables 5, 6 and 7 (Unit is "part by weight". The compositions other than a fluorine-containing water- and oil-repelling agent and leveling agent are calculated as solid contents. As the polyfluorocarbon chain-containing compounds, these of Preparation Examples 1 to 6 mentioned hereinafter were used.) and further stirred sufficiently with adding a curing agent and other additives to give paint compositions.

The symbols in the tables show the same materials as those in Tables 1 to 3.

By using these paint compositions, the coating and baking were carried out in the same manner as in Example 1 to give coated articles. The characteristics of the coating of the obtained coated articles were evaluated in the same manner as in Example 1. The results are shown in Tables 5 to 7.

TABLE 5

|  | Ex. 11 | Ex. 12 | Ex. 13 | Ex. 14 | Ex. 15 | Ex. 16 |
|---|---|---|---|---|---|---|
| (Main component) |  |  |  |  |  |  |
| Acrydic A-801 (a) |  |  |  |  | 62 | 62 |
| Zeffle GK-510 (b) | 80 |  | 80 |  |  |  |
| Almatex P-646 (j) |  | 75 |  | 75 |  |  |
| (Curing agent) |  |  |  |  |  |  |
| Coronate 2507 (c) |  |  |  |  | 38 | 38 |
| Cymel 303 (d) | 20 | 25 | 20 | 25 |  |  |
| (Polyfluorinated carbon chain-containing compound) |  |  |  |  |  |  |
| Preparation Ex. 1 | 0.075 |  |  |  |  |  |
| Preparation Ex. 2 |  | 0.70 |  |  |  |  |
| Preparation Ex. 3 |  |  | 0.075 |  |  |  |
| Preparation Ex. 4 |  |  |  | 0.70 |  |  |
| Preparation Ex. 5 |  |  |  |  | 0.75 |  |
| Preparation Ex. 6 |  |  |  |  |  | 0.75 |
| (Silicone oil) |  |  |  |  |  |  |
| KF6001 (g) | 0.075 | 0.70 | 0.075 | 0.70 | 0.75 | 0.75 |
| (Leveling agent) |  |  |  |  |  |  |
| KP-324 (h) |  | 1.25 |  |  |  |  |
| (Others) |  |  |  |  |  |  |
| Dibutyltindilaurate |  |  |  |  | 0.015 | 0.015 |
| p-toluenesulfonic acid | 1.0 | 0.7 | 1.0 | 0.7 |  |  |
| R-960 (Titanium white) (i) | 50 | 40 | 50 | 40 | 50 | 50 |
| Solvent (butyl acetate, etc.) | 100 | 93 | 100 | 93 | 100 | 100 |
| (Film characteristics) |  |  |  |  |  |  |
| Contact angle (°) |  |  |  |  |  |  |
| for water | 103 | 103 | 102 | 99 | 97 | 101 |
| for n-hexadecane | 32 | 36 | 35 | 27 | 26 | 30 |
| Stain resistance using red ink |  |  |  |  |  |  |
| Cissing of red ink | ○ | ○ | ○ | ○ | ○ | ○ |
| Stain mark after wiping red ink | ○ | ○ | ○ | ○-Δ | ○-Δ | ○-Δ |

TABLE 6

|  | Com. Ex. 13 | Com. Ex. 14 | Com. Ex. 15 | Com. Ex. 16 | Com. Ex. 17 | Com. Ex. 18 |
|---|---|---|---|---|---|---|
| (Main component) |  |  |  |  |  |  |
| Acrydic A-801 (a) |  |  |  |  |  |  |
| Zeffle GK-510 (b) |  |  |  | 80 |  | 80 |
| Almatex P-646 (j) | 75 | 75 | 75 |  | 75 |  |
| (Curing agent) |  |  |  |  |  |  |
| Coronate 2507 (c) |  |  |  |  |  |  |
| Cymel 303 (d) | 25 | 25 | 25 | 20 | 25 | 20 |
| (Polyfluorinated carbon chain-containing compound) |  |  |  |  |  |  |
| Preparation Ex. 1 |  |  | 0.075 |  |  |  |
| Preparation Ex. 2 |  |  |  | 0.70 |  |  |
| Preparation Ex. 3 |  |  |  |  |  | 0.075 |
| (Silicone oil) |  |  |  |  |  |  |
| KF6001 (g) |  | 0.70 |  |  |  |  |

TABLE 6-continued

| | Com. Ex. 13 | Com. Ex. 14 | Com. Ex. 15 | Com. Ex. 16 | Com. Ex. 17 | Com. Ex. 18 |
|---|---|---|---|---|---|---|
| (Leveling agent) | | | | | | |
| KP-324 (h) | | 1.17 | | | | |
| (Others) | | | | | | |
| Dibutyltindilaurate | | | | | | |
| p-toluenesulfonic acid | 0.7 | 0.7 | 0.7 | 1.0 | 0.7 | 1.0 |
| R-960 (Titanium white) (i) | 40 | 40 | 40 | 50 | 40 | 50 |
| Solvent | 93 | 93 | 93 | 100 | 93 | 100 |
| (butyl acetate, etc.) | | | | | | |
| (Film characteristics) | | | | | | |
| Contact angle (°) | | | | | | |
| for water | 77 | 90 | 97 | 101 | 95 | 90 |
| for n-hexadecane | wet | 18 | 27 | 17 | 19 | 15 |
| Stain resistance using red ink | | | | | | |
| Cissing of red ink | X | X | ○ | X | X | X |
| Stain mark after wiping red ink | X | Δ | X | Δ | X | X |

TABLE 7

| | Com. Ex. 19 | Com. Ex. 20 | Com. Ex. 21 | Com. Ex. 22 |
|---|---|---|---|---|
| (Main component) | | | | |
| Acrydic A-801 (a) | 62 | 62 | 62 | |
| Zeffle GK-510 (b) | | | | 80 |
| (Curing agent) | | | | |
| Coronate 2507 (c) | 38 | 38 | 38 | |
| Cymel 303 (d) | | | | 20 |
| (Polyfluorinated carbon chain-containing compound) | | | | |
| Preparation Ex. 1 | | | | 5.00 |
| Preparation Ex. 4 | 0.75 | | | |
| Preparation Ex. 5 | | 0.75 | | |
| Preparation Ex. 6 | | | 0.75 | |
| (Silicone oil) | | | | |
| KF6001 (g) | | | | 5.00 |
| (Leveling agent) | | | | |
| KP-324 (h) | | | | 1.25 |
| (Others) | | | | |
| Dibutyltindilaurate | 0.015 | 0.015 | 0.015 | |
| p-toluenesulfonic acid | | | | 1.0 |
| R-960 (Titanium white) (i) | 50 | 50 | 50 | 50 |
| Solvent | 100 | 100 | 100 | 100 |
| (butyl acetate, etc.) | | | | |
| (Film characteristics) | | | | |
| Contact angle (°) | | | | |
| for water | 99 | 97 | 90 | 106 |
| for n-hexadecane | 18 | 17 | 15 | 35 |
| Stain resistance using red ink | | | | |
| Cissing of red ink | X | X | X | ○ |
| Stain mark after wiping red ink | X | X | X | X |

PREPARATION EXAMPLE 1

A 500 ml flask was charged with 100 g of isostearyl alcohol having an average molecular weight of 270, 100 ml of chloroform solvent and 0.5 ml of $BF_3$ Etherate. While the mixture was refluxed with heating at 60° C., 194.6 g (0.37 mole) of perfluoroepoxy compound $(CF_3)_2CF(CF_2)_6CH_2C_2H_3O$ was slowly added dropwise through a dropping funnel, followed by heating and stirring for 12 hours, and after the reaction, washing with 10% $NaHCO_3$ solution, drying with anhydrous magnesium sulfate, filtrating, and distilling off of the solvent in the filtrate under a reduced pressure to give 281 g of light yellow oily compound.

PREPARATION EXAMPLE 2

A four necked flask was charged with polypropylene glycol (200 g) having an average molecular weight of 1,055 in $CH_2Cl_2$ (200 cc), and $BF_3OEt$ (0.03 ml) was added. While heating and refluxing isoperfluorooctylpropoxy (150 g) was added dropwise thereto. After the reaction, the reaction mixture was extracted with $CH_2Cl_2$ and washed with saturated $NaHCO_3$ and pure water. After that, the organic layer was separated, followed by drying with $Na_2SO_4$, filtrating and condensating at 50° C. under a reduced pressure to give an oily compound (280 g).

PREPARATION EXAMPLE 3

Epoxide  (60 g) and polypropylene glycol (163 g) having an average molecular weight of 1,055 were dissolved in $CH_2Cl_2$ (200 cc) in a four necked flask, and $BF_3OEt$ (0.3 ml) was added dropwise with heating and refluxing. After the reaction, the reaction mixture was extracted with $CH_2Cl_2$ and washed with saturated $NaHCO_3$ and pure water, followed by separating of the organic layer, drying with $Na_2SO_4$, filtrating, and condensating at 50° C. under a reduced pressure to give an oily compound (120 g).

PREPARATION EXAMPLE 4

A 500 ml autoclave was charged with 73.1 g of isohexanol, 300 ml of dimethylsulfoxide and 10 g of 85% KOH pellets, and tetrafluoroethylene was introduced thereto at a pressure of 5 kg/cm²G with stirring at 60° C. After the stirring for 20 hours, the reaction mixture was poured into water, extracted with chloroform and washed with 5% HCl and 5% $NaHCO_3$, followed by drying with anhydrous magnesium sulfate and distilling off of the solvent under a reduced pressure. The yield was 80.8 g (88% yeild).

PREPARATION EXAMPLE 5

A 500 cc autoclave was charged with trimethylol ethane (30 g), NaOH (2.1 g) and DMSO (200 cc), and after replacing with nitrogen and reducing the inner pressure, chlorotrifluoroethylene (96 g) was added. Chlorotrifluoroethylene was additionally introduced every time when consumed. The reaction was carried out in a state as the reaction temperature increased. After the reaction, the reaction mixture was extracted with S-3 and washed with water, 1N aqueous HCl solution and then saturated aqueous NaCl solution. The organic layer was dried with $Na_2SO_4$, filtrated, and then condensed at 50° C. under a reduced pressure to give an oily compound (83 g).

PREPARATION EXAMPLE 6

A 500 ml autoclave made of SUS316 was charged with 56.2 g of polyglycerin (OH value 1,045 mg/g), 300 ml of dimethylsulfoxide and 10.0 g of KOH, and with stirring at room temperature, tetrafluoroethylene was introduced into the liquid phase portion so as to make the pressure thereof to be 5 kg/cm²·G. The reaction temperature increased up to 50° C. due to heat generation.

After 2.5 hours stirring, the unreacted tetrafluoroethylene was purged and 100 ml of chloroform was added, followed by washing with 5% aqueous HCl solution and 10% NaHCO₃ solution, drying with anhydrous magnesium sulfate, filtrating and distilling off of the solvent in the filtrate under a reduced pressure to give a colorless oily compound of 113.2 g.

INDUSTRIAL APPLICABILITY

Coated articles excellent in water- and oil-repelling property and stain resistance can be obtained by using the paint composition of the present invention, which is prepared by adding silicone oil to polyfluorinated carbon chain-containing compound.

We claim:

1. A paint composition in which a solvent is an organic solvent comprising, as a leveling agent, 0.01 to 3 parts by weight of a polyfluorinated carbon chain-containing compound and 0.01 to 3 parts by weight of silicone oil per 100 parts by weight of a film forming component;

said polyfluorinated carbon chain-containing compound being at least one selected from the group consisting of a fluorine-containing surfactant, a fluorine-containing oil, a polymer of an ethylenically unsaturated monomer having a perfluoroalkyl group, a copolymer of an ethylenically unsaturated monomer having a perfluoroalkyl group and a monomer copolymerizable therewith, and a fluorosilicone oil, and said film forming component is at least one film forming resin selected from the group consisting of polyamideimide resin, polyimide resin, polyamide resin, epoxy resin, polyester resin having curable moieties, acrylic silicone resin, silicone polyester resin, poly(vinylidene fluoride) resin (including mixture with acrylic resin), acrylic resin having curable moieties, and solvent soluble fluorine-containing copolymer having curable moieties which is mixed with an isocyanate compound or an alkylether amino resin as a curing agent.

2. The paint composition of claim 1, wherein the polyfluorinated carbon chain-containing compound is the fluorosilicone oil.

3. The paint composition of claim 1, wherein the film forming component is the solvent soluble fluorine-containing copolymer having curable moieties which is mixed with an isocyanate compound or an alkylether amino resin as a curing agent.

4. The paint composition of claim 1, wherein the polyfluorinated carbon chain-containing compound is the fluorosilicone oil, and the film forming component is the solvent soluble fluorine-containing copolymer having curable moieties which is mixed with an isocyanate compound or an alkylether amino resin as a curing agent.

5. A paint composition comprising, as a leveling agent, 0.01 to 3 parts by weight of a polyfluorinated carbon chain-containing compound and 0.01 to 3 parts by weight of silicone oil per 100 parts by weight of a film forming component;

said polyfluorinated carbon chain-containing compound being at least one selected from the group consisting of a fluorine-containing surfactant, a fluorine-containing oil, a polymer of an ethylenically unsaturated monomer having a perfluoroalkyl group, a copolymer of an ethylenically unsaturated monomer having a perfluoroalkyl group and a monomer copolymerizable therewith, and a fluorosilicone oil, and said film forming component is at least one film forming resin selected from the group consisting of polyamideimide resin, polyimide resin, polyamide resin, epoxy resin, polyester resin having curable moieties, acrylic silicone resin, silicone polyester resin, poly(vinylidene fluoride) resin (including mixture with acrylic resin), acrylic resin having curable moieties, and solvent soluble fluorine-containing copolymer having curable moieties which is mixed with an isocyanate compound or an alkyelether amino resin as a curing agent, wherein said polyfluorinated carbon chain-containing compound is a fluorinated hydrocarbon compound having oxygen atom in its molecule and is represented by the formula:

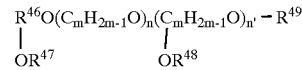

wherein, m is an integer of 2 to 5, n is an integer of 0 to 30, n' is an integer of 0 to 30, and $1 \leq n+n' \leq 30$, $R^{46}$ and $R^{47}$ are hydrogen atom, a partly or completely fluorinated linear or branched alkyl group, alkenyl group, or alkoxyalky group having 1 to 50 carbon atoms (which may be substituted partly by a halogen atom other than fluorine atom, or may have 1 to 3 OH groups in its structure) or a partly or completely fluorinated fluoropolyether group having 2 to 700 carbon atoms (which may be substituted partly by a halogen atom other than fluorine atom, may have 1 to 3 unsaturated bonds in its structure or may have ether bonds at its side chain), and $R^{48}$ and $R^{49}$ are a partly or completely fluorinated linear or branched alkyl group, alkenyl group or alkoxyalkyl group having 1 to 50 carbon atoms (which may be substituted partly by a halogen atom other than fluorine atom, or may have 1 to 3 OH groups in its structure), or a partly or completely fluorinated fluoropolyether group having 2 to 700 carbon atoms (which may be substituted partly by a halogen atom other than fluorine atom, may have 1 to 3 unsaturated bonds in its structure or may have ether bond at its side chain.

* * * * *